(12) United States Patent
Sullivan et al.

(10) Patent No.: US 10,822,168 B2
(45) Date of Patent: Nov. 3, 2020

(54) WAREHOUSING SCALABLE STORAGE STRUCTURE

(75) Inventors: Robert Sullivan, Wilmington, MA (US); John Lert, Wakefield, MA (US)

(73) Assignee: Symbotic LLC, Wilmington, MA (US)

(*) Notice: Subject to any disclaimer, the term of this patent is extended or adjusted under 35 U.S.C. 154(b) by 686 days.

(21) Appl. No.: 13/326,674

(22) Filed: Dec. 15, 2011

(65) Prior Publication Data

US 2012/0195720 A1 Aug. 2, 2012

Related U.S. Application Data

(60) Provisional application No. 61/423,340, filed on Dec. 15, 2010.

(51) Int. Cl.
*B65G 1/04* (2006.01)

(52) U.S. Cl.
CPC ............. *B65G 1/0492* (2013.01); *B65G 1/04* (2013.01)

(58) Field of Classification Search
None
See application file for complete search history.

(56) References Cited

U.S. PATENT DOCUMENTS

| | | |
|---|---|---|
| 1,845,962 A | 2/1932 | Dorr |
| 1,887,667 A | 11/1932 | Wheeler |
| 2,606,508 A | 8/1952 | Van Nes |
| 2,673,689 A | 3/1954 | Bonanno |
| 2,923,421 A | 2/1960 | De Senigon De Roumefort |
| 2,945,604 A | 7/1960 | Kroll et al. |
| 2,996,621 A | 8/1961 | Barrett, Jr. |
| 3,016,154 A | 1/1962 | Ugolini et al. |
| 3,161,303 A | 12/1964 | Burrows |
| 3,162,459 A | 12/1964 | Marmorine et al. |
| 3,269,744 A | 8/1966 | Dobson |
| 3,370,492 A | 2/1968 | Treff |
| 3,455,468 A | 7/1969 | Sanford |
| 3,554,390 A | 1/1971 | Saul |
| 3,581,915 A | 1/1971 | Saul |
| 3,677,421 A | 7/1972 | Kintner |
| 3,737,056 A | 6/1973 | Hathcock, Jr. |
| 3,738,506 A | 6/1973 | Cornford et al. |
| 3,744,945 A | 7/1973 | Metrailer |
| 3,802,580 A | 4/1974 | Castaldi |

(Continued)

FOREIGN PATENT DOCUMENTS

| | | |
|---|---|---|
| DE | 2150500 | 10/1971 |
| DE | 1104527 | 8/1992 |

(Continued)

OTHER PUBLICATIONS

International Search Report, International Application No. PCT/US2015/065574, dated Feb. 2, 2016.

*Primary Examiner* — Saul Rodriguez
*Assistant Examiner* — Willie Berry, Jr.
(74) *Attorney, Agent, or Firm* — Perman & Green, LLP

(57) ABSTRACT

A storage and retrieval system is provided and includes a transfer deck having a longitudinal axis, a first storage section and a second storage section. The first storage section and second storage section are located on opposite sides of the transfer deck and are substantially symmetrically opposed to one another about the longitudinal axis, where each of the first and second storage sections includes storage aisles that are in communication with the transfer deck.

19 Claims, 17 Drawing Sheets

(56) References Cited

U.S. PATENT DOCUMENTS

| | | |
|---|---|---|
| 3,845,715 A | 11/1974 | Hochstraser |
| 3,850,111 A | 11/1974 | Hansen |
| 3,876,087 A | 4/1975 | Osta |
| 3,896,955 A | 7/1975 | Collins et al. |
| 3,904,216 A | 9/1975 | Metrailer |
| 3,940,105 A | 2/1976 | Metrailer |
| 3,970,840 A | 7/1976 | De Bruine |
| 3,976,302 A | 8/1976 | Hammarstrand |
| 4,057,019 A | 11/1977 | Shaffer |
| 4,079,955 A | 3/1978 | Thorpe et al. |
| 4,174,854 A | 11/1979 | Spicka et al. |
| 4,183,304 A | 1/1980 | Furster |
| 4,213,396 A | 7/1980 | Mehren et al. |
| 4,223,611 A | 9/1980 | Dawson et al. |
| 4,271,764 A | 6/1981 | Braun et al. |
| 4,273,234 A | 6/1981 | Bourgeois |
| 4,307,988 A | 12/1981 | Page et al. |
| 4,346,659 A | 8/1982 | Binder |
| 4,353,572 A | 10/1982 | McCain |
| 4,372,219 A | 2/1983 | Gibbs |
| 4,394,104 A | 7/1983 | Camerini et al. |
| 4,395,181 A | 7/1983 | Loomer |
| 4,406,570 A | 9/1983 | Duncan et al. |
| 4,415,975 A | 11/1983 | Burt |
| 4,428,708 A | 1/1984 | Burt |
| 4,445,440 A | 5/1984 | Geiss |
| 4,459,078 A | 7/1984 | Chiantella et al. |
| 4,470,742 A | 9/1984 | Schindler |
| 4,492,504 A | 1/1985 | Hainsworth |
| 4,527,486 A | 7/1985 | Baird et al. |
| 4,678,390 A | 7/1987 | Bonneton et al. |
| 4,679,149 A | 7/1987 | Merz |
| 4,716,530 A | 12/1987 | Ogawa et al. |
| 4,733,740 A | 3/1988 | Bigowsky et al. |
| 4,750,429 A | 6/1988 | Mordaunt et al. |
| 4,777,416 A | 10/1988 | George, III et al. |
| 4,786,229 A | 11/1988 | Henderson |
| 4,811,229 A | 3/1989 | Wilson |
| 4,856,263 A | 8/1989 | Schneider et al. |
| 4,878,876 A | 11/1989 | Ishimoto |
| 4,883,401 A | 11/1989 | Kavieff |
| 4,909,697 A | 3/1990 | Bernard, II et al. |
| 4,936,738 A | 6/1990 | Brennan et al. |
| 4,967,370 A | 10/1990 | Stern et al. |
| 4,987,992 A | 1/1991 | Pfleger |
| 5,002,449 A | 3/1991 | Kita et al. |
| 5,015,145 A | 5/1991 | Angell et al. |
| 5,069,592 A | 12/1991 | Galperin |
| 5,096,355 A | 3/1992 | Schroder |
| 5,134,353 A | 7/1992 | Kita et al. |
| 5,134,940 A | 8/1992 | Fujita et al. |
| 5,135,344 A | 8/1992 | Kita et al. |
| 5,140,787 A | 8/1992 | Corcoran |
| 5,156,639 A | 10/1992 | Bostrom |
| 5,168,815 A | 12/1992 | Corner et al. |
| 5,179,329 A | 1/1993 | Nishikawa et al. |
| 5,187,664 A | 2/1993 | Yardley et al. |
| 5,218,909 A | 6/1993 | Ng |
| 5,220,263 A | 6/1993 | Onishi et al. |
| 5,238,100 A | 8/1993 | Rose, Jr. et al. |
| 5,271,703 A | 12/1993 | Lindqvist et al. |
| 5,273,392 A | 12/1993 | Bernard, II et al. |
| 5,323,098 A | 6/1994 | Hamaguchi et al. |
| 5,327,354 A | 7/1994 | Tsujimoto |
| 5,333,982 A | 8/1994 | Tanizawa |
| 5,333,983 A | 8/1994 | Hatouchi et al. |
| 5,337,880 A | 8/1994 | Claycomb et al. |
| 5,350,270 A | 9/1994 | Stallard et al. |
| 5,370,492 A | 12/1994 | Gleyze et al. |
| 5,377,851 A | 1/1995 | Asano et al. |
| 5,379,229 A | 1/1995 | Parsons et al. |
| 5,380,139 A | 1/1995 | Pohjonen et al. |
| 5,388,955 A | 2/1995 | Schroder |
| 5,395,206 A | 3/1995 | Cerny, Jr. |
| 5,403,147 A | 4/1995 | Tanaka |
| 5,405,232 A | 4/1995 | Lloyd et al. |
| 5,425,612 A | 6/1995 | Ebstein |
| 5,434,490 A | 7/1995 | Ishida et al. |
| 5,450,797 A | 9/1995 | Becker et al. |
| 5,472,309 A | 12/1995 | Bernard, II et al. |
| 5,501,295 A | 3/1996 | Miiller et al. |
| 5,509,538 A | 4/1996 | Spindler et al. |
| 5,525,884 A | 6/1996 | Sugiura et al. |
| 5,529,165 A | 6/1996 | Shupert |
| 5,559,696 A | 9/1996 | Borenstein |
| 5,601,395 A | 2/1997 | Lichti, Sr. et al. |
| 5,615,992 A | 4/1997 | Proske et al. |
| 5,664,929 A | 9/1997 | Esaki et al. |
| 5,667,230 A | 9/1997 | Riley et al. |
| 5,718,322 A | 2/1998 | Mulhern |
| 5,718,551 A | 2/1998 | Ebstein |
| 5,709,291 A | 6/1998 | Nishino et al. |
| 5,764,014 A | 6/1998 | Jakeway et al. |
| 5,798,920 A | 8/1998 | Crucius et al. |
| 5,801,506 A | 9/1998 | Netzler |
| 5,833,431 A | 11/1998 | Rosse, III et al. |
| 5,839,872 A | 11/1998 | Goto et al. |
| 5,857,413 A | 1/1999 | Ward |
| 5,927,926 A | 7/1999 | Yagi et al. |
| 5,928,058 A | 7/1999 | Francis et al. |
| 5,974,348 A | 10/1999 | Rocks |
| 5,988,306 A | 11/1999 | Ooishi |
| 6,000,502 A | 12/1999 | Leasor et al. |
| 6,036,427 A | 3/2000 | Kita et al. |
| 6,061,607 A | 5/2000 | Bradley et al. |
| 6,062,942 A | 5/2000 | Ogihara |
| 6,149,366 A | 11/2000 | Deandrea |
| 6,158,566 A | 12/2000 | Pollock |
| 6,213,704 B1 | 4/2001 | White et al. |
| 6,272,406 B2 | 8/2001 | Alofs et al. |
| 6,289,260 B1 | 9/2001 | Bradley et al. |
| 6,295,922 B1 | 10/2001 | Salamone et al. |
| 6,324,994 B1 | 12/2001 | Glenn |
| 6,325,586 B1 | 12/2001 | Loy |
| 6,341,269 B1 | 1/2002 | Dulaney et al. |
| 6,345,217 B1 | 2/2002 | Zeitler et al. |
| 6,352,035 B1 | 3/2002 | Kashiwase et al. |
| 6,360,673 B1 | 3/2002 | Herrin et al. |
| 6,377,867 B1 | 4/2002 | Bradley et al. |
| 6,389,981 B1 | 5/2002 | Strothmann et al. |
| 6,390,756 B1 | 5/2002 | Isaacs et al. |
| 6,391,226 B1 | 5/2002 | Chauvette et al. |
| 6,394,260 B1 | 5/2002 | Barth et al. |
| 6,397,990 B1 | 6/2002 | Brien et al. |
| 6,439,131 B1 | 8/2002 | Higgins |
| 6,439,955 B1 | 8/2002 | Feketo |
| 6,463,360 B1 | 10/2002 | Terada et al. |
| 6,496,755 B2 | 12/2002 | Wallach et al. |
| 6,597,143 B2 | 7/2003 | Song et al. |
| 6,629,502 B2 | 10/2003 | Matsukawa |
| 6,652,213 B1 | 11/2003 | Mitchell et al. |
| 6,655,297 B2 | 12/2003 | Kawato et al. |
| 6,663,334 B2 | 12/2003 | Warhurst et al. |
| 6,721,638 B2 | 4/2004 | Zeitler |
| 6,748,292 B2 | 6/2004 | Mountz |
| 6,763,767 B2 | 7/2004 | Jackson et al. |
| 6,764,373 B1 | 7/2004 | Osawa et al. |
| 6,808,058 B2 | 10/2004 | Shiohara |
| 6,836,701 B2 | 12/2004 | McKee |
| 6,859,682 B2 | 2/2005 | Naka et al. |
| 6,861,154 B2 | 3/2005 | Olson et al. |
| 6,864,489 B2 | 3/2005 | Chen et al. |
| 6,929,440 B1 | 8/2005 | Grond |
| 6,948,899 B2 | 9/2005 | Lee |
| 6,950,722 B2 | 9/2005 | Mountz |
| 6,988,451 B2 | 1/2006 | Marcotte et al. |
| 7,003,375 B2 | 2/2006 | Inui |
| 7,008,164 B2 | 3/2006 | Rokkaku |
| 7,025,191 B2 | 4/2006 | Lichti et al. |
| 7,039,501 B2 | 5/2006 | Freeman et al. |
| 7,054,716 B2 | 5/2006 | McKee et al. |
| 7,066,291 B2 | 6/2006 | Martins et al. |
| 7,069,124 B1 | 6/2006 | Whittaker et al. |
| 7,101,139 B1 | 9/2006 | Benedict |

(56) References Cited

U.S. PATENT DOCUMENTS

| | | |
|---|---|---|
| 7,110,855 B2 | 9/2006 | Leishman |
| 7,133,746 B2 | 11/2006 | Abramson et al. |
| 7,137,593 B2 | 11/2006 | Baatz |
| 7,266,422 B1 | 9/2007 | DeMotte et al. |
| 7,284,652 B2 | 10/2007 | Zeitler et al. |
| 7,329,081 B2 | 2/2008 | Baker et al. |
| 7,332,890 B2 | 2/2008 | Cohen et al. |
| 7,376,487 B2 | 5/2008 | Kumhyr |
| 7,381,022 B1 | 6/2008 | King |
| 7,397,213 B2 | 7/2008 | Im et al. |
| 7,402,018 B2 | 7/2008 | Mountz et al. |
| 7,460,462 B2 | 9/2008 | Chin et al. |
| 7,421,268 B2 | 10/2008 | Steiner et al. |
| 7,456,596 B2 | 11/2008 | Goodall et al. |
| 7,495,561 B2 | 2/2009 | Bodin et al. |
| 7,499,155 B2 | 3/2009 | Cappelletti |
| 7,520,376 B2 | 4/2009 | Bar |
| 7,532,947 B2 | 5/2009 | Waddington et al. |
| 7,536,283 B2 | 5/2009 | Potter et al. |
| 7,568,572 B2 | 8/2009 | Zeitler et al. |
| 7,575,406 B2 | 8/2009 | Hofmeister et al. |
| 7,584,812 B2 | 9/2009 | Radke et al. |
| 7,615,957 B2 | 11/2009 | Kim et al. |
| 7,653,457 B2 | 1/2010 | Bloom |
| 7,671,293 B2 | 3/2010 | Fry et al. |
| 7,686,560 B2 | 3/2010 | Laurin et al. |
| 7,693,757 B2 | 4/2010 | Zimmerman |
| 7,695,235 B1 | 4/2010 | Rallis |
| 7,706,917 B1 | 4/2010 | Chiappetta et al. |
| 7,725,253 B2 | 5/2010 | Foxlin |
| 7,729,801 B2 | 6/2010 | Abramson |
| 7,751,928 B1 | 7/2010 | Antony et al. |
| 7,771,152 B2 | 8/2010 | Waltersbacher |
| 7,783,383 B2 | 8/2010 | Eliuk et al. |
| 7,826,919 B2 | 11/2010 | D'Andrea et al. |
| 7,826,920 B2 | 11/2010 | Stevens et al. |
| 7,856,290 B2 | 12/2010 | Kumhyr |
| 7,861,844 B2 | 1/2011 | Hayduchok et al. |
| 7,873,469 B2 | 1/2011 | D'Andrea et al. |
| 7,894,940 B2 | 2/2011 | Kumhyr |
| 7,931,431 B2 | 4/2011 | Benedict et al. |
| 7,941,244 B2 | 5/2011 | Somin et al. |
| 7,944,368 B2 | 5/2011 | Carter et al. |
| 7,959,395 B2 | 6/2011 | Hofmeister et al. |
| 7,963,384 B2 | 6/2011 | Lafontaine |
| 7,972,102 B2 | 7/2011 | Ward et al. |
| 7,988,398 B2 | 8/2011 | Hofmeister et al. |
| 7,991,505 B2 | 8/2011 | Lert, Jr. et al. |
| 8,006,824 B2 | 8/2011 | Wada et al. |
| 8,024,064 B1 | 9/2011 | Saughavi et al. |
| 8,028,822 B2 | 10/2011 | Braunstein |
| 8,046,103 B2 | 10/2011 | Abramson et al. |
| 8,046,160 B2 | 10/2011 | Carter et al. |
| 8,047,756 B2 | 11/2011 | Tuffs et al. |
| 8,425,173 B2 | 4/2013 | Lert et al. |
| 8,480,347 B2 | 7/2013 | Schafer |
| 8,894,344 B2 | 11/2014 | Merry et al. |
| 8,954,188 B2 | 2/2015 | Sullivan et al. |
| 9,008,884 B2 | 4/2015 | Toebes et al. |
| 9,037,286 B2 | 5/2015 | Lert |
| 9,321,591 B2 | 4/2016 | Lert et al. |
| 2002/0029719 A1 | 3/2002 | Matsukawa |
| 2002/0037208 A1 | 3/2002 | Patrito |
| 2002/0076307 A1 | 6/2002 | Fallin et al. |
| 2002/0124389 A1 | 9/2002 | Matson |
| 2003/0033217 A1 | 2/2003 | Cutlip |
| 2003/0069665 A1 | 4/2003 | Haag |
| 2003/0200129 A1 | 10/2003 | Klaubauf et al. |
| 2004/0088081 A1 | 5/2004 | Song et al. |
| 2004/0093116 A1 | 5/2004 | Mountz |
| 2004/0238326 A1 | 12/2004 | Lichti |
| 2005/0008463 A1* | 1/2005 | Stehr ............ B65G 1/1378 414/277 |
| 2005/0035138 A1 | 2/2005 | Guerra |
| 2005/0158154 A1* | 7/2005 | Leerintveld ........ B65G 1/0464 414/277 |
| 2005/0166787 A1 | 8/2005 | Astrom |
| 2005/0217532 A1 | 10/2005 | Conneally |
| 2006/0104712 A1 | 5/2006 | Bufano et al. |
| 2006/0245858 A1 | 11/2006 | Suess |
| 2006/0257236 A1 | 11/2006 | Stingel, III et al. |
| 2007/0021864 A1 | 1/2007 | Mountz et al. |
| 2007/0059132 A1 | 3/2007 | Akamatsu et al. |
| 2007/0061041 A1 | 3/2007 | Zweig |
| 2007/0065258 A1 | 3/2007 | Benedict et al. |
| 2007/0065259 A1 | 3/2007 | Talley |
| 2007/0068770 A1 | 3/2007 | Koide et al. |
| 2007/0071585 A1 | 3/2007 | Henkel |
| 2007/0114975 A1 | 5/2007 | Cohen et al. |
| 2007/0177011 A1 | 8/2007 | Lewin et al. |
| 2007/0267998 A1 | 11/2007 | Cohen et al. |
| 2007/0288123 A1 | 12/2007 | D'Andrea et al. |
| 2007/0290040 A1 | 12/2007 | Wurman et al. |
| 2007/0293978 A1 | 12/2007 | Wurman et al. |
| 2008/0001372 A1 | 1/2008 | Hoffman et al. |
| 2008/0007203 A1 | 1/2008 | Cohen et al. |
| 2008/0025833 A1 | 1/2008 | Baker et al. |
| 2008/0044262 A1 | 2/2008 | Kim et al. |
| 2008/0075357 A1 | 3/2008 | Yoon et al. |
| 2008/0080963 A1 | 4/2008 | Bufano et al. |
| 2008/0129445 A1 | 6/2008 | Kraimer et al. |
| 2008/0166217 A1 | 7/2008 | Fontana |
| 2008/0174268 A1 | 7/2008 | Koo et al. |
| 2008/0215180 A1 | 9/2008 | Kota |
| 2008/0230291 A1 | 9/2008 | Kersting |
| 2008/0281717 A1 | 11/2008 | Kortelainen |
| 2009/0033316 A1 | 2/2009 | Hosek et al. |
| 2009/0074545 A1 | 3/2009 | Lert et al. |
| 2009/0085741 A1 | 4/2009 | Ravi et al. |
| 2009/0099879 A1 | 4/2009 | Ouimet |
| 2009/0114115 A1 | 5/2009 | Minges |
| 2009/0148259 A1 | 6/2009 | Shani |
| 2009/0185884 A1 | 7/2009 | Wurman et al. |
| 2009/0188774 A1 | 7/2009 | Tsujimoto |
| 2009/0224750 A1 | 9/2009 | Hosek et al. |
| 2009/0265031 A1 | 11/2009 | Tachibana et al. |
| 2009/0284245 A1 | 11/2009 | Kirby et al. |
| 2009/0308000 A1 | 12/2009 | Corcoran |
| 2009/0315501 A1 | 12/2009 | Li et al. |
| 2010/0044124 A1 | 2/2010 | Radke et al. |
| 2010/0044977 A1 | 2/2010 | Hughes et al. |
| 2010/0086385 A1 | 4/2010 | Shani |
| 2010/0118149 A1 | 5/2010 | Levin et al. |
| 2010/0121481 A1 | 5/2010 | Talley et al. |
| 2010/0183409 A1 | 7/2010 | Checketts et al. |
| 2010/0185353 A1 | 7/2010 | Barwick et al. |
| 2010/0188210 A1 | 7/2010 | Howard et al. |
| 2010/0277005 A1 | 11/2010 | Karalis et al. |
| 2010/0277121 A1 | 11/2010 | Hall et al. |
| 2010/0295943 A1 | 11/2010 | Cha et al. |
| 2010/0305854 A1 | 12/2010 | Kammel et al. |
| 2010/0308939 A1 | 12/2010 | Kurs |
| 2010/0316468 A1 | 12/2010 | Lert et al. |
| 2010/0322748 A1* | 12/2010 | Lee ............... B65G 1/02 414/281 |
| 2011/0038692 A1 | 2/2011 | Hofmeister et al. |
| 2011/0043373 A1 | 2/2011 | Best et al. |
| 2011/0058926 A1 | 3/2011 | Winkler |
| 2011/0068943 A1 | 3/2011 | Lane, Jr. |
| 2011/0082583 A1 | 4/2011 | Kumbyr |
| 2011/0106295 A1 | 5/2011 | Miranda et al. |
| 2011/0118903 A1 | 5/2011 | Kraimer et al. |
| 2011/0125323 A1 | 5/2011 | Gutmann et al. |
| 2011/0148364 A1 | 6/2011 | Ota |
| 2011/0182703 A1 | 7/2011 | Alan |
| 2011/0202175 A1 | 8/2011 | Romanov et al. |
| 2011/0208350 A1 | 8/2011 | Eliuk et al. |
| 2011/0216185 A1 | 9/2011 | Laws et al. |
| 2011/0238206 A1 | 9/2011 | Somin et al. |
| 2011/0254503 A1 | 10/2011 | Widmer et al. |
| 2011/0285349 A1 | 11/2011 | Widmer et al. |
| 2012/0185082 A1 | 7/2012 | Toebes et al. |
| 2013/0096735 A1 | 4/2013 | Byford et al. |

(56) References Cited

U.S. PATENT DOCUMENTS

| | | |
|---|---|---|
| 2013/0245810 A1 | 9/2013 | Sullivan et al. |
| 2014/0056672 A1 | 2/2014 | Mathys et al. |
| 2014/0124462 A1 | 5/2014 | Yamashita |
| 2014/0288696 A1 | 9/2014 | Lert |
| 2015/0158677 A1 | 6/2015 | Philipp et al. |
| 2016/0167880 A1 | 6/2016 | Pankratov et al. |
| 2016/0207710 A1 | 7/2016 | Conrad et al. |
| 2016/0214797 A1 | 7/2016 | Pankratov et al. |
| 2016/0214808 A1 | 7/2016 | Cyrulik et al. |
| 2016/0260158 A1 | 9/2016 | High et al. |

FOREIGN PATENT DOCUMENTS

| | | |
|---|---|---|
| DE | 4104527 | 8/1992 |
| DE | 20011661 | 12/2000 |
| DE | 10142395 | 11/2002 |
| EP | 0466004 | 7/1991 |
| EP | 0499276 | 8/1992 |
| EP | 0737630 | 10/1996 |
| EP | 1193195 | 4/2002 |
| EP | 1598291 | 11/2005 |
| EP | 1627830 | 6/2006 |
| EP | 1775240 | 9/2006 |
| EP | 2039580 | 1/2008 |
| EP | 2436620 | 4/2012 |
| EP | 1775240 | 4/2017 |
| FR | 2730715 | 2/1995 |
| JP | 5389180 | 8/1978 |
| JP | 60183405 | 9/1985 |
| JP | 61094905 | 5/1986 |
| JP | 61271505 | 12/1986 |
| JP | 62140902 | 6/1987 |
| JP | 2002167006 | 6/2002 |
| JP | 3102245 | 7/2004 |
| JP | 2008044732 | 2/2008 |
| TW | 200823122 | 6/2008 |
| WO | 9534491 | 12/1995 |
| WO | 2005/071597 | 1/2005 |
| WO | 2005009324 | 2/2005 |
| WO | 2005056943 | 6/2005 |
| WO | 2006095047 | 9/2006 |
| WO | 2009/106988 | 9/2009 |
| WO | 2010118412 | 10/2010 |

\* cited by examiner

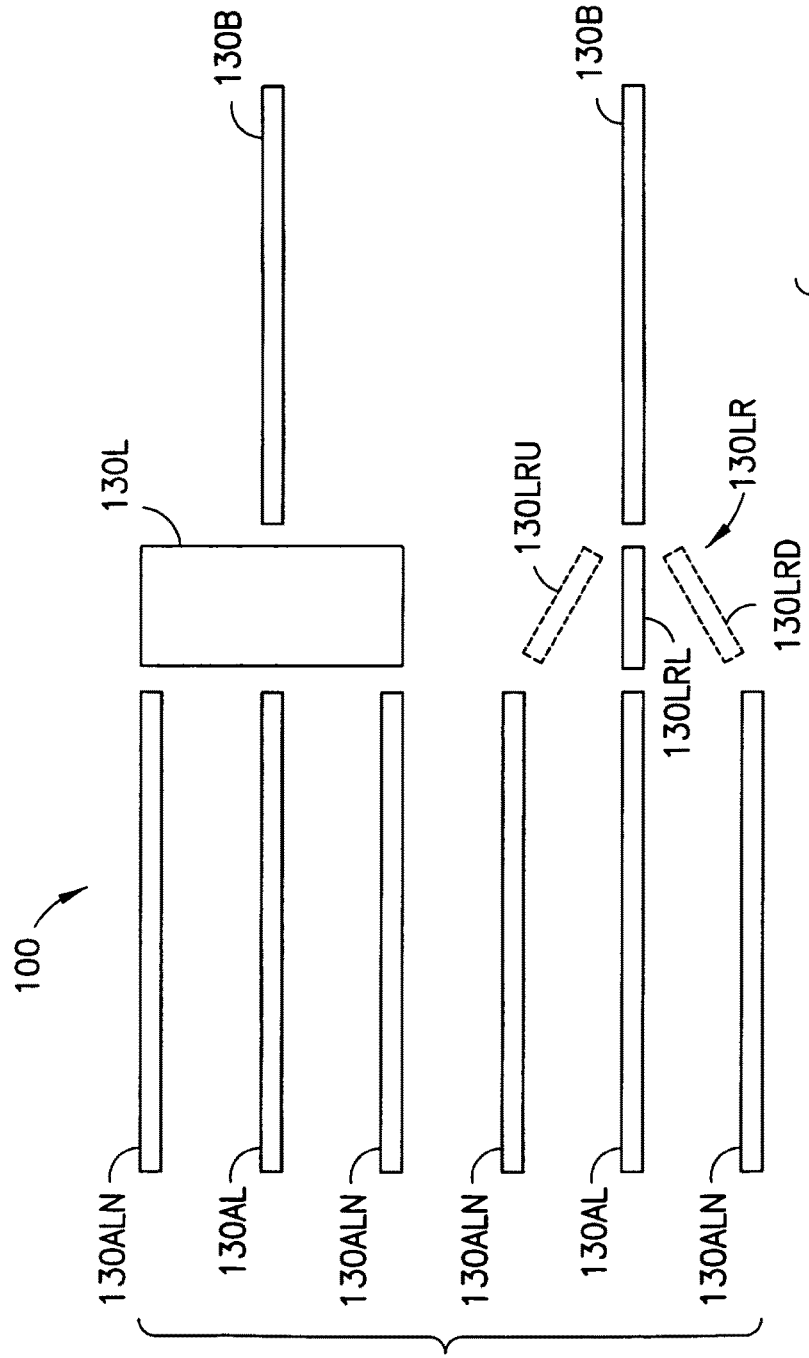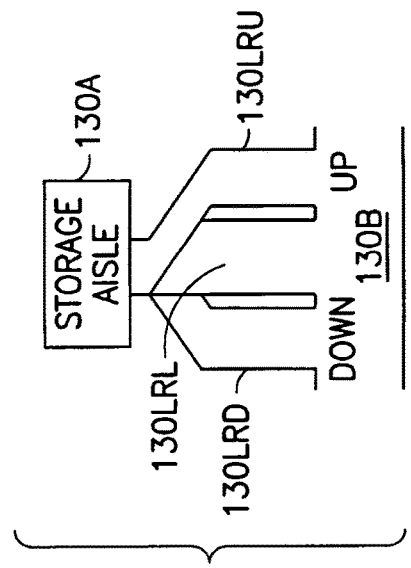

WAREHOUSING SCALABLE STORAGE STRUCTURE

CROSS-REFERENCE TO RELATED APPLICATIONS

This application is a non-provisional of and claims the benefit of U.S. provisional patent application No. 61/423,340 filed on Dec. 15, 2010, the disclosure of which is incorporated herein by reference in its entirety.

BACKGROUND

1. Field

The embodiments generally relate to material handling systems and, more particularly, to storage structures for warehouse storage systems.

2. Brief Description of Related Developments

Generally the storage of items within, for example, a warehouse requires a large building or storage structure space with an associated footprint. As may be realized, length of the storage aisles of the warehouse structure and the travel paths for accessing each of these storage aisles depends on the amount of items (e.g. goods) stored in the warehouse. As may also be realized, stored items within the storage space are demanded at a given output (such as for subsequent shipping) at a desired rate (e.g. throughput) that is effected by the storage and retrieval system. In one example of a typical warehouse, to keep the length of the travel paths for accessing each of the storage/picking aisles at a minimum, the storage aisles must have a sufficient length for storing all of the desired goods. However, the length of the each of the storage aisles may be substantially prohibitive due to, for example, the building in which the storage structure is located and/or the distance traveled to access items within the storage aisles being excessive causing excessive travel or transport time and a corresponding deleterious effect on throughput. To prevent excessively long storage aisles the width of the storage structure may be adjusted so that the length of each storage aisle is decreased and the number of storage aisles is increased. However, increasing the number of the storage aisles also increases the distance traveled along the travel paths for accessing each of the storage aisles. As with the long storage aisles, the length of the travel paths may become substantially prohibitive for reasons similar to those described above with respect to the length of the storage aisles.

It would be advantageous to have a warehouse storage structure that provides substantially short travel distances and times along the travel paths as well as within the storage aisles.

BRIEF DESCRIPTION OF THE DRAWINGS

The foregoing aspects and other features of the disclosed embodiments are explained in the following description, taken in connection with the accompanying drawings, wherein:

FIGS. 6A-6F are schematic illustrations of other exemplary storage structures in accordance with embodiments;

DETAILED DESCRIPTION OF THE EXEMPLARY EMBODIMENT(S)

Figure 1:
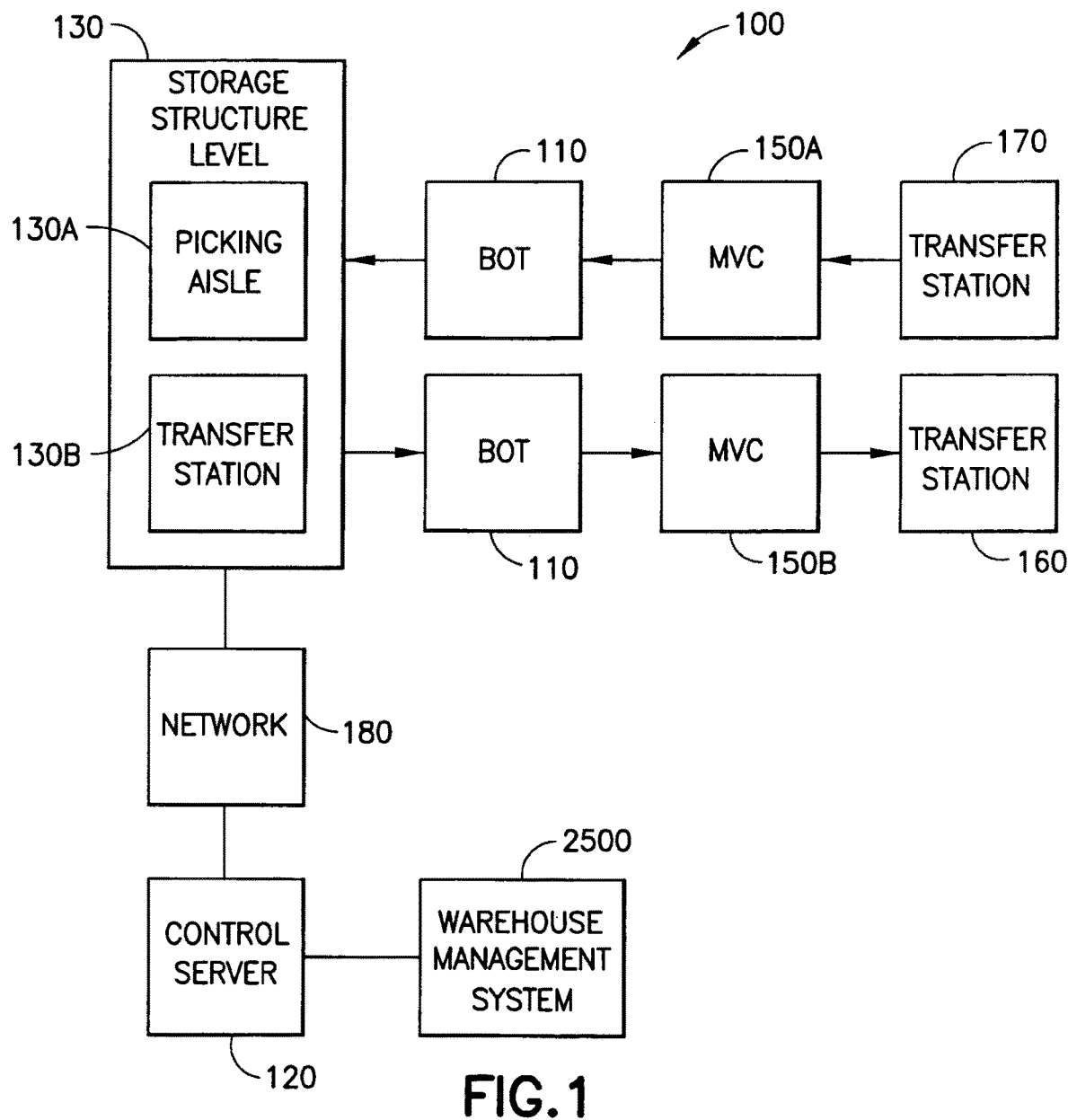
FIG. 1 schematically illustrates an exemplary storage and retrieval system in accordance with the embodiments.

FIG. 1 schematically illustrates an exemplary storage and retrieval system in accordance with the embodiments. Although the disclosed embodiments will be described with reference to the embodiments shown in the drawings, it should be understood that the disclosed embodiments can be embodied in many alternate forms. In addition, any suitable size, shape or type of elements or materials could be used.

In accordance with the embodiments the storage and retrieval system 100 may operate in a retail distribution center or warehouse to, for example, fulfill orders received from retail stores for case units. In one example, the case units may be cases or units of goods not stored in trays, on totes or on pallets (e.g. uncontained). In other examples, the case units may be cases or units of goods that are contained in any suitable manner such as in trays, on totes or on pallets. It is noted that the case units may include cased units of goods (e.g. case of soup cans, boxes of cereal, etc.) or individual goods that are adapted to be taken off of or placed on a pallet. In accordance with the embodiments, shipping cases for case units (e.g. cartons, barrels, boxes, crates, jugs, or any other suitable device for holding case units) may have variable sizes and may be used to hold case units in shipping and may be configured so they are capable of being palletized for shipping. It is noted that when, for example, bundles or pallets of case units arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different case units (e.g. each pallet may hold different types of case units—a pallet holds a combination of soup and cereal). In the embodiments the storage and retrieval system described herein may be applied to any environment in which case units are stored and retrieved.

The storage and retrieval system 100 may be configured for installation in, for example, existing warehouse structures or adapted to new warehouse structures. In the embodiments, the storage and retrieval system may include in-feed and out-feed transfer stations 170, 160, multilevel vertical conveyors 150A, 150B (generally referred to as multilevel vertical conveyors 150), a storage structure 130, and a number of autonomous vehicular transport robots 110 (referred to herein as "bots"). In the embodiments the storage and retrieval system may also include robot or bot transfer stations, as described in U.S. patent application Ser. No. 12/757,220 entitled "Storage and Retrieval System" filed on Apr. 9, 2010 the disclosure of which is incorporated by reference herein in its entirety. In the embodiments the bot transfer stations may provide an interface between the bots 110 and the multilevel vertical conveyors 150 such that case units can be indirectly transferred between the bots 110 and the multilevel vertical conveyors 150 through the bot transfer stations. In the embodiments case units may be transferred directly between the bots 110 and the multilevel vertical conveyors 150.

The storage structure 130 may include multiple levels of storage rack modules where each level includes respective storage aisles 130A, and transfer decks 130B for transferring case units between any of the storage areas of the storage structure 130 and any shelf of any multilevel vertical conveyors 150. The storage aisles 130A, and transfer decks 130B are also configured to allow the bots 110 to traverse the storage aisles 130A and transfer decks 130B for placing case units into picking stock and to retrieve ordered case units. The bots 110 may be any suitable bots capable of carrying and transferring case units throughout the storage and retrieval system 100. Suitable examples of bots can be found in, for exemplary purposes only, U.S. patent application Ser. No. 12/757,312 entitled "Autonomous Transports for Storage and Retrieval Systems" filed on Apr. 9, 2010, U.S. patent application Ser. No. 13/326,423 which is non-provisional of U.S. Ser. No. 61/423,409 filed on Dec. 15, 2010) entitled "Autonomous Transport Vehicle" filed on Dec. 15, 2011, U.S. patent application Ser. No. 13/326,447 which is non-provisional of U.S. Ser. No. 61/423,359 filed on Dec. 15, 2010) entitled "Bot Having High Speed Stability" filed on Dec. 15, 2011, U.S. patent application Ser. No. 13/326,505 which is non-provisional of U.S. Ser. No. 61/423,317 filed on Dec. 15, 2010) entitled "Suspension System for Autonomous Transports" filed on Dec. 15, 2011, U.S. patent application Ser. No. 13/327,040 which is non-provisional of U.S. Ser. No. 61/423,220 filed on Dec. 15, 2010) entitled "Bot Payload Alignment and Sensing" filed on Dec. 15, 2011, U.S. patent application Ser. No. 13/326,952 which is non-provisional of U.S. Ser. No. 61/423,365 filed on Dec. 15, 2010) entitled "Automated Bot with Transfer Arm" filed on Dec. 15, 2011, and U.S. patent application Ser. No. 13/326,993 which is non-provisional of U.S. Ser. No. 61/423,388 filed on Dec. 15, 2010) entitled "Automated Bot Transfer Arm Drive System" filed on Dec. 15, 2011, the disclosures of which are incorporated by reference herein in their entireties. The bots 110 may be configured to place case units, such as the above described retail merchandise, into picking stock in the one or more levels of the storage structure 130 and then selectively retrieve ordered case units for shipping the ordered case units to, for example, a store or other suitable location. The in-feed transfer stations 170 and out-feed transfer stations 160 may operate together with their respective multilevel vertical conveyors 150A, 150B for bi-directionally transferring case units to and from one or more levels of the storage structure 130. It is noted that while the multilevel vertical conveyors are described as being dedicated inbound conveyors 150A and outbound conveyors 150B, in the embodiments each of the conveyors 150A, 150B may be used for both inbound and outbound transfer of case units from the storage and retrieval system. It is noted that while multilevel vertical conveyors are described herein in other aspects the conveyors may be any suitable conveyors or transfer/picking devices having any suitable transport path orientation.

Figure 2:
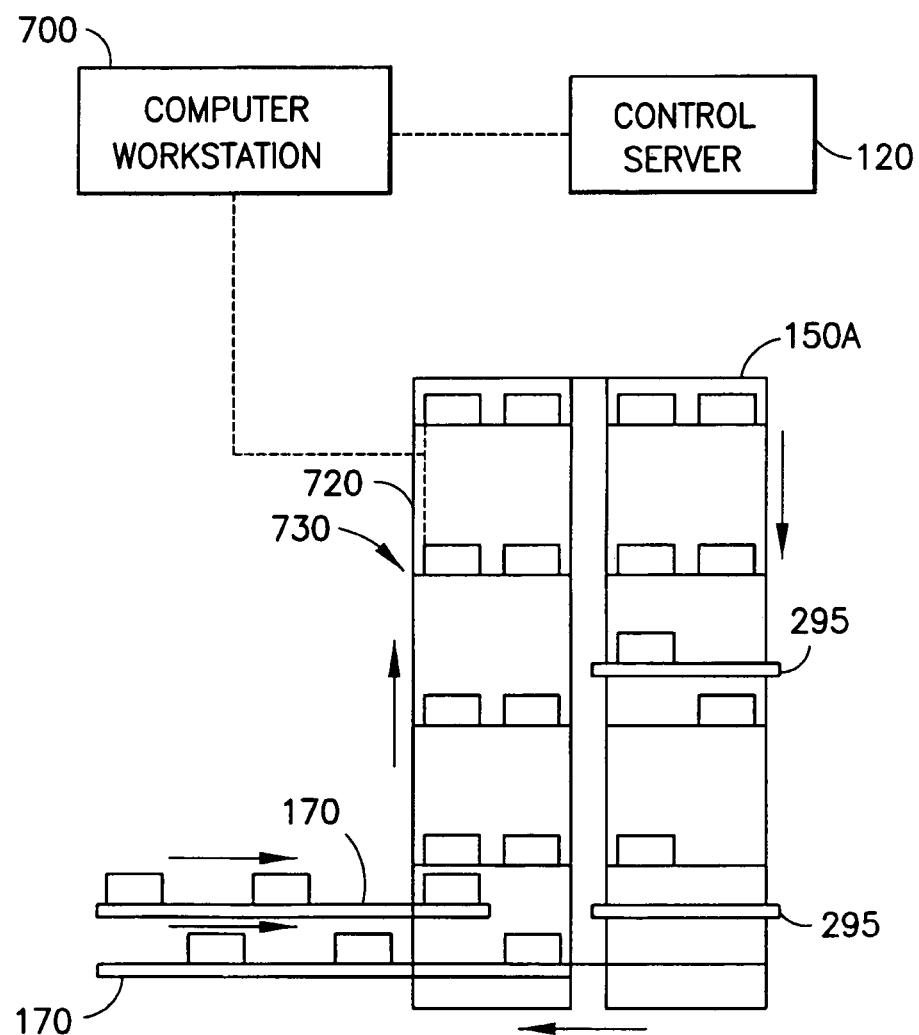
FIG. 2 is a schematic illustration of a portion of the storage and retrieval system of FIG. 1.

Referring also to FIG. 2, generally, the multilevel vertical conveyors include payload shelves 730 attached to chains, belts or other suitable transmission(s) 720 that form continuously moving or circulating vertical loops (the shape of the loop shown in the Figs. is merely exemplary and in the embodiments the loop may have any suitable shape including rectangular and serpentine) that move at a substantially constant rate, so that the shelves 730 use what may be referred to as the "paternoster" principle of continuous conveyance, with loading and unloading performed at any point in the loop without slowing or stopping. The multilevel vertical conveyors 150A, 150B may be controlled by a server, such as for example, control server 120, or any other suitable controller. One or more suitable computer workstations 700 may be connected to the multilevel vertical conveyors 150A, 150B and the server 120 in any suitable manner (e.g. wired or wireless connection) for providing, as an example, inventory management, multilevel vertical conveyor functionality and control, and customer order fulfillment. As may be realized, the computer workstations 700 and/or server 120 may be programmed to control the in-feed and/or out-feed conveyor systems. In the embodiments, the computer workstations 700 and/or server 120 may also be programmed to control the transfer stations 140. In the embodiments, one or more of the workstations 700 and control server 120 may include a control cabinet, a programmable logic controller and variable frequency drives for driving the multilevel vertical conveyors 150A, 150B. In the embodiments the workstations 700 and/or control server 120 may have any suitable components and configuration. In the embodiments, the workstations 700 may be configured to substantially remedy any exceptions or faults in the in-feed and/or out-feed conveyor systems substantially without operator assistance and communicate fault recovery scenarios with the control server 120 and/or vice versa.

It is noted that the multilevel vertical conveyors may be substantially similar to those described in U.S. patent application Ser. No. 12/757,354 entitled "LIFT INTERFACE FOR STORAGE AND RETRIEVAL SYSTEMS" filed on Apr. 9, 2010 the disclosure of which is incorporated by reference herein in its entirety. As may be realized, the storage and retrieval system 100 may include multiple in-feed and out-feed multilevel vertical conveyors 150A, 150B that are accessible by, for example, bots 110 on each level of the storage and retrieval system 100 so that one or more case unit(s) can be transferred from a multilevel vertical conveyor 150A, 150B to each storage space on a respective level and from each storage space to any one of the multilevel vertical conveyors 150A, 150B on a respective level. The bots 110 may be configured to transfer the case units between the storage spaces and the multilevel vertical conveyors with one pick (e.g. substantially directly between the storage spaces and the multilevel vertical conveyors). By way of further example, the designated bot 110 picks the case unit(s) from a shelf of a multilevel vertical conveyor 150, transports the case unit(s) to a predetermined storage area of the storage structure 130 and places the case unit(s) in the predetermined storage area (and vice versa).

The bots 110 and other suitable features of the storage and retrieval system 100 may be controlled by, for example, one or more central system control computers (e.g. control server) 120 through, for example, any suitable network 180. The network 180 may be a wired network, a wireless network or a combination of a wireless and wired network using any suitable type and/or number of communication protocols. It is noted that, in the embodiments, the system control server 120 may be configured to manage and coordinate the overall operation of the storage and retrieval system 100 and interface with, for example, a warehouse management system 2500, which in turn manages the warehouse facility as a whole. The control server 120 may be substantially similar to that described in, for example, U.S. patent application Ser. No. 12/757,337 entitled "Control System for Storage and Retrieval Systems" filed on Apr. 9, 2010 the disclosure of which is incorporated by reference herein in its entirety. For example, the control server 120 may include a collection of substantially concurrently running programs that are configured to manage the storage and retrieval system 100 including, for exemplary purposes only, controlling, scheduling, and monitoring the activities of all active system components, managing inventory and pickfaces, and interfacing with the warehouse management system 2500. It is noted that a "pickface" as used herein may be one or more merchandise case units placed one behind the other in a storage space or area of a storage shelf to be used in pick transactions for filling customer orders. In one example, all case units forming a given pickface are of the same stock keeping unit (SKU) and originally from the same pallet. In the embodiments, each pickface may include any suitable case units. Each pickface may correspond to all or part of a bot load (e.g. the load carried by each bot 110 to and from the storage areas). Conversely, the bot load may be established based on a pickface determination. As may be realized the determination of the pickfaces may be variable within the storage and retrieval system such that the size and locations of the pickface are dynamically changeable. It is also noted that interfacing with the warehouse management system allows the control server 120 to receive and execute pallet orders and to submit and execute replenishment orders. The active system components may be the physical entities that act upon the case units to be stored and retrieved. The active system components may include, as a non-limiting example, the bots, in-feed and out-feed stations, multilevel vertical conveyors, the network and user interface terminals. In the embodiments, the active system components may also include transfer stations.

Figure 3:
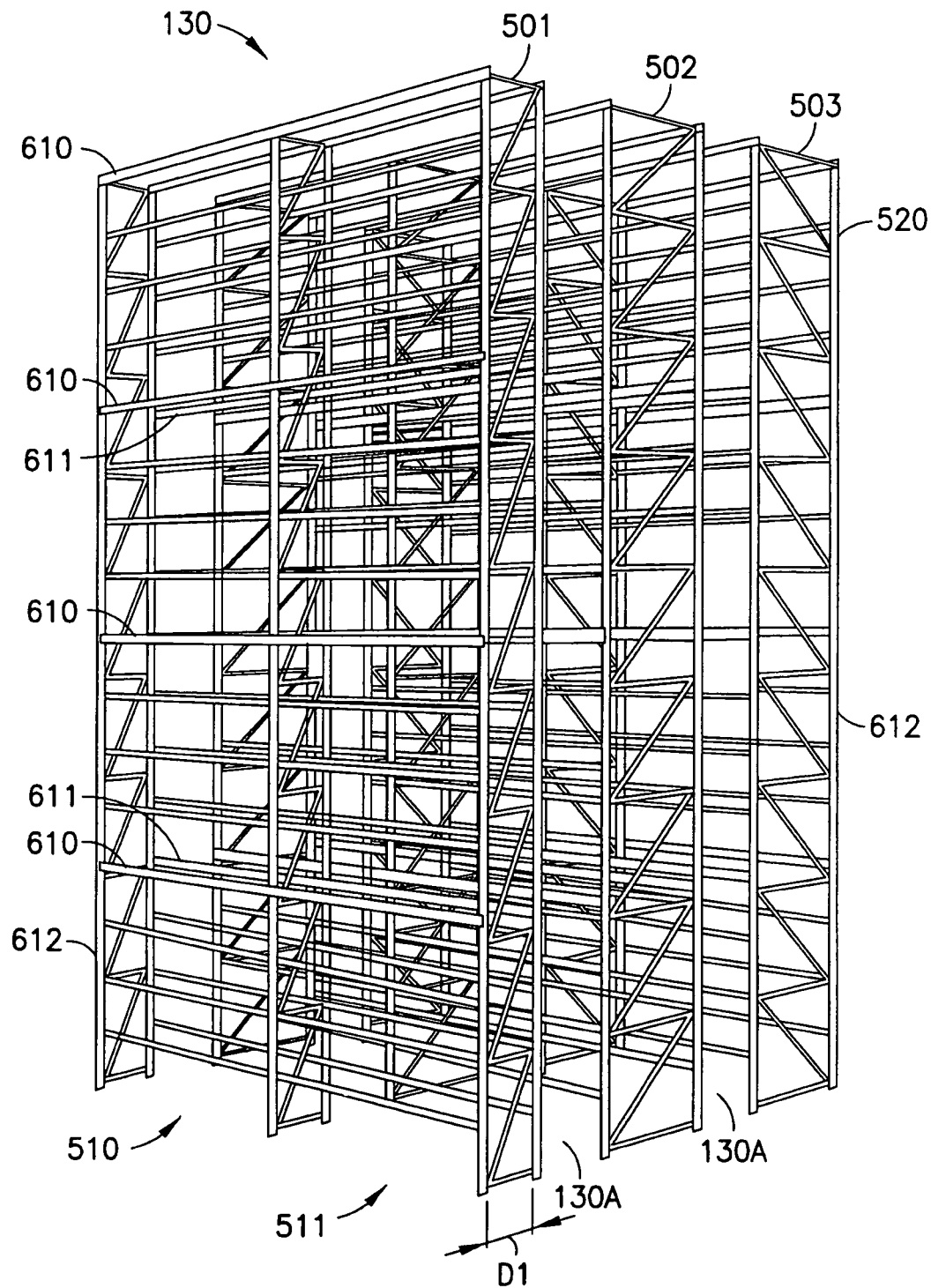
FIG. 3 is a schematic illustration of a portion of the storage and retrieval system of FIG. 1.
Figure 4:
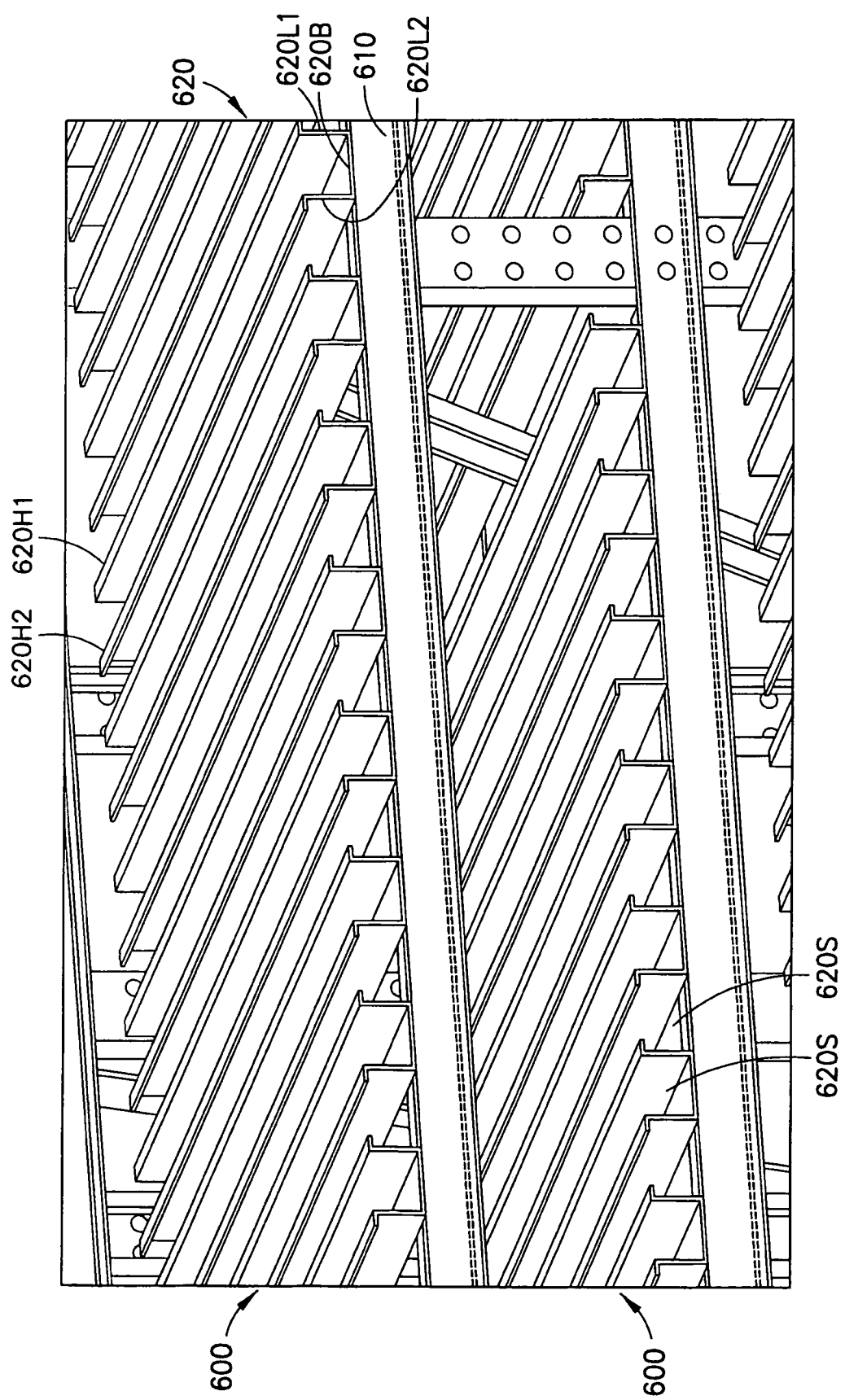
FIG. 4 is a schematic illustration of a portion of the storage and retrieval system of FIG. 1.

Referring to FIGS. 3 and 4, the storage structure 130 will be described in greater detail. In accordance with the embodiments, the storage structure 130 may include, for example, any suitable number of vertical supports 612 and any suitable number of horizontal supports 610, 611, 613. It is noted that the terms vertical and horizontal are used for exemplary purposes only and that the supports of the storage structure 130 may have any suitable spatial orientation. In the embodiments, the vertical supports 612 and horizontal supports 610, 611, 613 may form an array of storage modules 501, 502, 503 having storage bays 510, 511. The horizontal supports 610, 611, 613 may be configured to support the storage shelves 600 (FIG. 4) as well as the floors for the aisle spaces 130A, which may include tracks or other suitable guidance features for the bots 110. The floors may be attached to, for example, one or more of the vertical and horizontal supports (or any other suitable support structure) in any suitable manner such as with any suitable fasteners including, but not limited to bolts and welds. For exemplary purposes only, in one example the aisle floor may be a solid floor having any suitable construction such as for example a layered construction. In other examples the aisle floors may have a honeycomb structure or other suitable lightweight yet substantially rigid structure. In still other examples the aisle may have rails or tracks 1300 (FIG. 6F) located on either side of the aisle for the bot 110 to travel on where the aisle is substantially floor-less between the rails. Suitable examples of tracks are described in U.S. patent application Ser. No. 12/757,312 entitled "Autonomous Transports for Storage and Retrieval Systems," previously incorporated by reference. As may be realized, the substantially floor-less configuration of the rails or tracks on each picking level may allow maintenance personnel to walk down the storage aisles where the height between each storage level would otherwise substantially prevent the maintenance personnel from traversing the storage aisles. In the embodiments the storage aisles may have any suitable floor that extends between adjacent storage areas on either side of the storage aisle.

Each of the storage bays 510, 511 may hold the picking stock on storage shelves 600 that are separated by aisle spaces 130A. It is noted that in the embodiments the vertical supports 612 and/or horizontal supports 610, 611, 613 may be configured to allow for adjusting the height or elevation of the storage shelves and/or aisle floors relative to, for example, each other and a floor of the facility in which the storage and retrieval system is located. In the embodiments the storage shelves and floors may be fixed in elevation. As can be seen in FIG. 3, storage module 501 is configured as an end module having, for example, about half the width of the other storage modules 502, 503. As an example, the end module 501 may have a wall located on one side and the aisle space 130A located on the opposite side. The depth D1 of end module 501 may be such that access to the storage shelves 600 on module 501 is achieved by the aisle space 130A located on but one side of the storage module 501, whereas the storage shelves 600 of modules 502, 503 may be accessed by storage aisles 130A located on both sides of the modules 502, 503 allowing for, as an example, the storage modules 502, 503 having a depth substantially twice that of the depth D1 of storage module 501.

In the embodiments, the storage shelves 600 may include one or more support legs 620L1, 620L2 extending from, for example, the horizontal supports 610, 611, 613. The support legs 620L1, 620L2 may have any suitable configuration and may be part of, for example, a substantially U-shaped channel 620 such that the legs are connected to each other through channel portion 620B. The channel portion 620B may provide an attachment point between the channel 620 and one or more horizontal supports 610, 611, 613. In the embodiments, each support leg 620L1, 620L2 may be configured to individually mount to the horizontal supports 610, 611, 613. In the embodiments, each support leg 620L1, 620L2 includes a bent portion 620H1, 620H2 having a suitable surface area configured to support case units stored on the shelves 600. The bent portions 620H1, 620H2 may be configured to substantially prevent deformation of the case units stored on the shelves. In the embodiments the leg portions 620H1, 620H2 may have a suitable thickness or have any other suitable shape and/or configuration for supporting case units stored on the shelves. As can be seen in FIG. 4, the support legs 620L1, 620L2 or channels 620 may form a slatted or corrugated shelf structure where spaces 620S between, for example, the support legs 620L1, 620L2 allow for arms or fingers of the bots 110 to reach into the shelving for transferring case units to and from the shelves. It is noted that the support legs 620L1, 620L2 of the shelves 600 may be configured for storing case units, where adjacent items are spaced any suitable distance from each other. It is noted that the configuration of the shelves 600 is exemplary and in the embodiments the shelves may have any suitable configuration for holding picking stock and interfacing with any suitable transfer mechanism of the bots 110 for transferring pickfaces between the shelves 600 and the bots 110.

Figure 5:
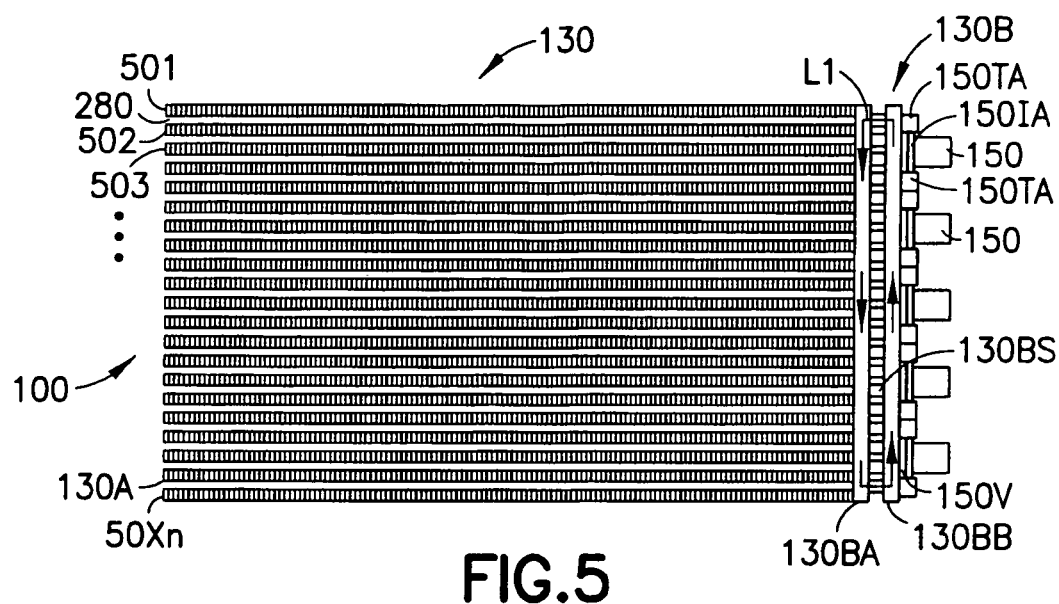
FIG. 5 is a schematic illustration of an exemplary storage structure in accordance with the embodiments.

Referring to FIG. 5, the storage modules 501, 502, 503, . . . , 50Xn may be arranged on one side of the transfer decks 130B while the multilevel vertical conveyors 150 are arranged on the other side of the transfer decks 130B. In the embodiments the transfer decks 130B may include a stacked or vertical array of, for example, substantially looped decks, where each level of the storage structure 130 includes one or more respective transfer decks 130. In the embodiments the transfer decks may have any suitable shape and configuration. In one example, each of the transfer decks 130B may form a unidirectional travel loop L1 where the bots travel in, for example, a clockwise or counter-clockwise direction (i.e. the bots 110 travel in a single predetermined direction around the transfer deck 130B) configured to connect all of the storage aisles 130A on a respective level to corresponding multilevel vertical conveyors 150 on the respective level. In the embodiments, the transfer decks may be bidirectional for allowing the bots to travel in substantially opposite directions around the transfer decks 130B. Suitable examples of transfer decks 130B that may be used with the embodiments described herein can be found in, for example, U.S. patent application Ser. No. 12/757,312 entitled "Autonomous Transports for Storage and Retrieval Systems" previously incorporated by reference herein in its entirety. It is noted that while five multilevel vertical conveyors 150 are shown in FIG. 5 for exemplary purposes only, in the embodiments the storage and retrieval system may have more or less than four multilevel vertical conveyors.

The transfer deck 130B may have, for example, main travel lanes 130BA, 130BB connected by any suitable number of shunts 130BS. The shunts 130BS may be configured to allow the bots 110 to transition between the main travel lanes 130BA, 130BB at any suitable predetermined intervals along the main travel lanes 130BA, 130BB such that the bots 110 do not have to traverse an entirety of the travel loop L1 for accessing the storage aisles 130A. In the embodiments, the shunts 130BS may be substantially aligned with the storage aisles 130A along the length of the transfer deck 130B, however in the embodiments the shunts may have any suitable spatial relationship relative to the storage aisles.

The travel lanes 130BA, 130BB of the transfer decks 130B may be wider than the travel lanes within the aisles 130A of the storage structure 130. For exemplary purposes only, travel lanes of the transfer decks 130B may be configured to allow the bots 110 to make different types of turns (as described in U.S. patent application Ser. No. 12/757,312 entitled "AUTONOMOUS TRANSPORTS FOR STORAGE AND RETRIEVAL SYSTEMS" previously incorporated by reference) when, for example, transitioning onto or off of the transfer decks 130B. The different types of turns may correspond to a desired orientation of the bot 110 within the storage aisles 130A or a lane of the transfer deck 130B on which the bot 110 is travelling. The floor of the transfer decks may have any suitable construction configured to support the bots 110 as they traverse their respective transfer deck(s) 130B. For exemplary purposes only, the transfer deck floors may be substantially similar to the storage aisle floors described above. The transfer deck floors may be supported by a lattice of frames and columns that may be connected to, for example, one or more of the vertical supports 612 and horizontal supports 610, 611, 613 in any suitable manner. For example, in the embodiments the transfer decks may include cantilevered arms that may be driven or otherwise inserted into corresponding slots, recesses or other openings in one or more of the vertical supports 612 and horizontal supports 610, 611, 613. In the embodiments the transfer deck floors may be supported by any suitable structure. As may be realized, a pitch of the transfer deck floors may be substantially similar to the pitch of the respective aisle floors.

In the embodiments, the storage structure 130 may include personnel floors 280 (which may include maintenance access gateways) associated with each level of the storage structure. The personnel floors 280 may be substantially similar to those described in U.S. patent application Ser. No. 12/757,381 entitled "Storage and Retrieval System" filed on Apr. 9, 2010, the disclosure of which is incorporated herein by reference in its entirety. For example, the personnel floors 280 may be located, for example, within or adjacent to the aisles of the storage structure and/or the transfer decks 130B. In the embodiments, the personnel floors may be suitably located to provided reach in access to one side of the transfer decks 130B from within the storage structure where the other opposite side of the transfer decks 130B is accessed through any suitable work platforms/scaffolding adjacent personnel workstations and/or multilevel vertical conveyors. In the embodiments, the personnel floors 280 may run the full length of each aisle 130A or transfer deck 130B. In the embodiments the personnel floors 280 may have any suitable length. The personnel floors 280 may be vertically spaced from each other at predetermined intervals where the space between the personnel floors 280 provides a personnel work zone for resolving problems with, as non-limiting examples, the bots 110, items stored in the storage structure 130 and the storage structure 130 itself. The personnel floors 280 may be configured to provide walking surfaces for, as an example, maintenance technicians or other personnel where the walking zones are distinct from travel lanes of the bots 110. Access to the personnel floors may be provided through, for example, any suitable access gateways or points within the storage structure 130. Movable barriers or other suitable structures may be provided along the aisles 130A and transfer decks 130B to further separate unintentional interaction between, for example the bots 110 and personnel. In the embodiments, in normal operation the movable barriers may be in a stowed or retracted position to allow, for example, the bot 110 to pass and access the storage shelves 600. The movable barriers may be placed in an extended position when personnel are located in a predetermined zone or location of the storage structure 130 to block bot 110 access to the aisle(s) or portions of the transfer decks where personnel are located. In one exemplary operation of storage structure maintenance for a predetermined zone of the storage structure 130, all active bots 110 may be removed from the predetermined zone. Bots 110 that require maintenance may be disabled and de-energized within the predetermined zone. The movable barriers may be extended to prevent active bots 110 from entering the predetermined zone and any locks preventing access to the personnel floors may be unlocked or removed. The extension and retraction of the movable barriers, disabling of the bots 110 and removal of bots 110 from the predetermined zone may be controlled in any suitable manner such as by, for example, any suitable control system such as a central controller server 120 and mechanical and/or electromechanical interlocks. It is noted that in the embodiments, the storage and retrieval system may include any suitable personnel access not limited to that described above.

The main travel lanes 130BA, 130BB may also provide the bots 110 with access to vestibules 150V for each multilevel vertical conveyor 150. As can be seen in FIG. 5, vestibules 150V connect their respective multilevel vertical conveyors 150 to the transfer deck 130B. In one example, each of the vestibules may include transition areas 150TA and a conveyor interface area 150IA. The transition areas 150TA may be configured to allow the bots 110 to transition from, for example, substantially contactless guided travel (e.g. travel that is free from being constrained by rails or tracks) on the transfer deck 130B to guided travel, such as by rails or tracks, within the conveyor interface areas 150IA. The transition areas 150TA may also be configured to allow bots 110 to merge with bot traffic on the transfer decks 130B as described in, for example, U.S. patent application Ser. No. 12/757,337 entitled "Control System for Storage and Retrieval Systems" previously incorporated by reference herein in its entirety. It is noted that the guided travel of the bots 110 within the conveyor interface areas 150IA may be substantially similar to the guided travel of the bots 110 within, for example, the storage aisles 130A. In the embodiments the bots may be suitably guided within the conveyor interface areas in any suitable manner. The vestibules 150V may be configured to allow the bots 110 to interface with respective multilevel vertical conveyors 150 without substantially impeding bot travel along the main travel lanes 130BA, 130BB. Shunts 130BS may also be substantially aligned with each of the transition areas 150TA for allowing access to the multilevel vertical conveyors from either of the main travel lanes 130BA, 130BB without traversing an entirety of the travel loop L1.

As may be realized, the configuration of the storage and retrieval system 100 is scalable and may change for any suitable reason such as, for non-limiting purposes, changes in storage capacity and product throughput. As an example, bots 110, multilevel vertical conveyors 150, storage bays/shelves, transfer decks 130B, transfer deck shunts 130BS or other suitable components of the storage and retrieval system 100 may be added or removed to suit any desired requirements of the warehouse in which the storage and retrieval system 100 is located.

Figure 6A:
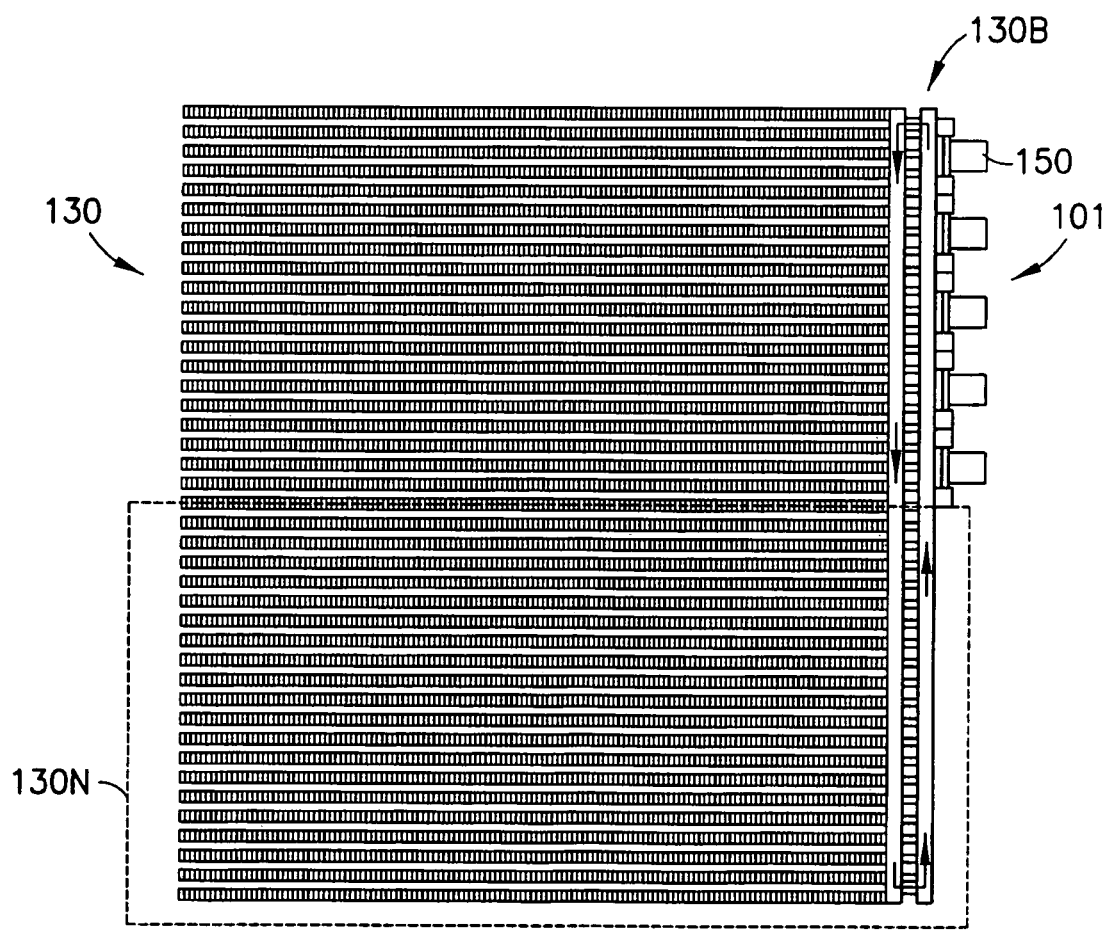
Figure 6B:
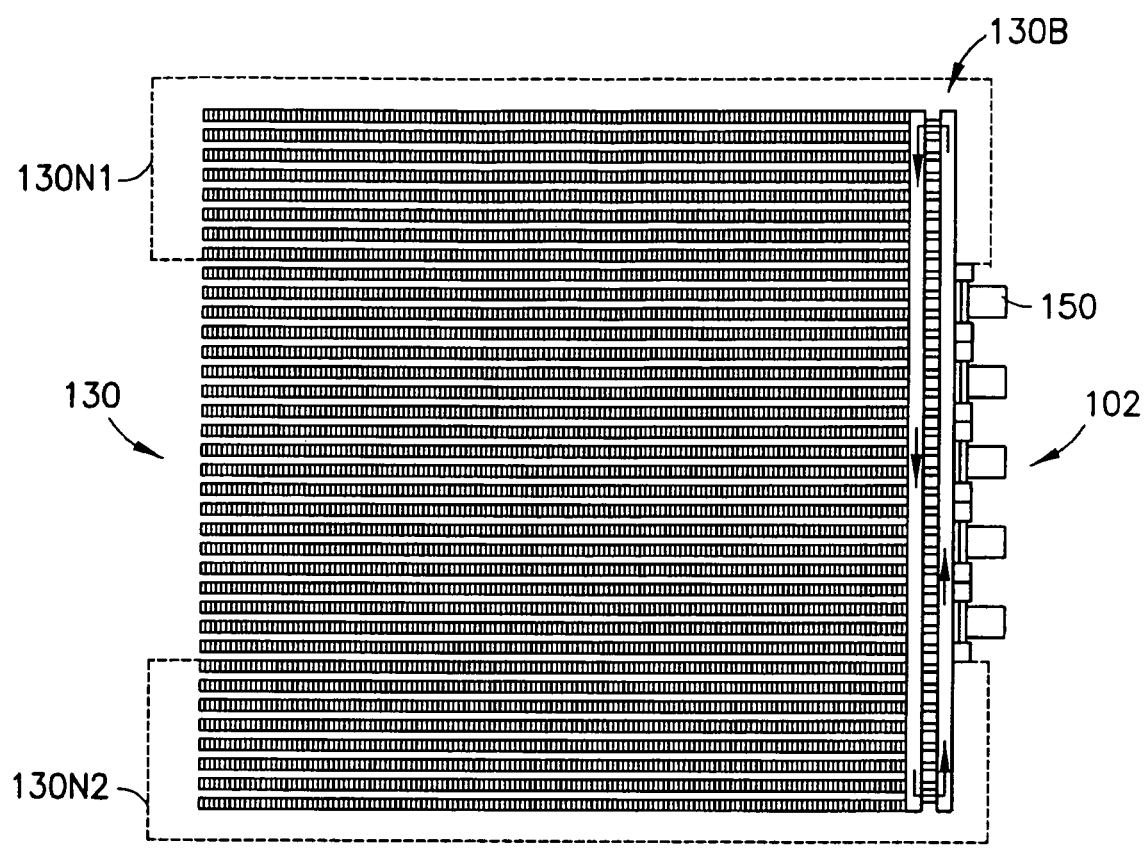
Figure 6C:
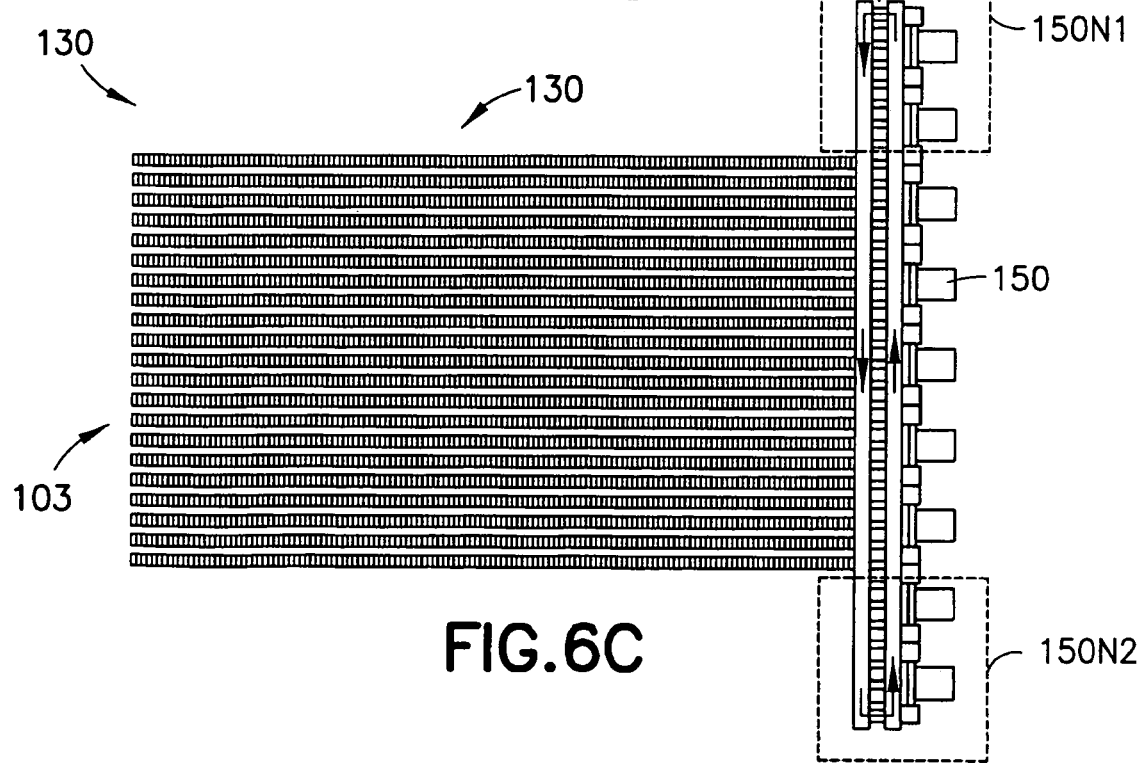

Referring to FIGS. 6A-6C, an example of the scalability of the storage and retrieval system 100 is shown. In FIG. 6A a storage and retrieval system 101 is shown. The storage and retrieval system 101 may be substantially similar to storage and retrieval system 100 described above. However, in this example, the transfer deck 130B is extended to accommodate any suitable number of additional storage bays 130N on one side of original storage bays 130. In FIG. 6B the storage and retrieval system 102 (which may be substantially similar to storage and retrieval system 100) is shown having an extended transfer deck 130B such that the deck extends from both sides of the original storage bays 130N. In this example, any suitable number of additional storage bays 130N1, 130N2 may be added on both sides of the storage and retrieval system. FIG. 6C illustrates another storage and retrieval system 103 (which may be substantially similar to storage and retrieval system 100) where the transfer deck 130B is extended to include additional multilevel vertical conveyors 150N1, 150N2. In the embodiments the length of each storage aisle may be increased to increase the storage area of the storage and retrieval system. As may be realized, any suitable number of the storage bays and/or multilevel vertical conveyors can be added or removed from the storage and retrieval system. For example, if the capacity or throughput of the multilevel vertical conveyors 150 is greater than the throughput of items through the storage aisles/bays additional storage aisles/bays may be added to balance the throughput of the multilevel vertical conveyors and the storage bays and vice versa. As another non-limiting example of throughput management, any suitable controller of the storage and retrieval system, such as control server 120, may be configured to control the bot 110 travel along the transfer deck 130B and multilevel vertical conveyors so that they function as buffers/accumulators. For example, if the throughput of the multilevel vertical conveyors is less than the throughput of items through the storage aisles/bays the bots 110 may be instructed by the control server 120 to slow their travel along the travel deck 130B or stop at a designated area(s) of the travel deck 130B until a multilevel vertical conveyor is available to receive the items carries by the bot. Where multilevel vertical conveyor throughput is greater than the storage aisle/bay throughput, the multilevel vertical conveyors 150 may carry items in a substantially continuous loop until a bot is available to receive the item(s) for transport to a storage location of the storage aisles/bays. In the embodiments the throughput of the storage and retrieval system components may be managed in any suitable manner. As may be realized, the structure of the storage and retrieval system may be such that additional components may be easily added or removed in any suitable manner for changing the configuration of the storage and retrieval system. For example, the storage and retrieval system components may be modular components that can be fastened to each other in any suitable manner such as with mechanical fasteners, clips, or any other suitable fastener (including e.g. welding and chemical fasteners).

Referring to FIG. 6D another example of the scalability of the storage and retrieval system 100 is shown. In this example, additional storage aisle levels 130ALN are vertically added to the storage and retrieval system, whereas in FIGS. 6A-6C the additional storage aisles 130N are added in a horizontal direction (it is noted that storage areas may be added in both horizontal and vertical directions as described herein). These additional storage aisle levels 130ALN may be added between existing storage aisle levels 130AL and/or stacked above and/or below the existing storage aisle levels. In FIG. 6D the additional storage aisles 130ALN are shown, for non-limiting exemplary purposes only, as being added between existing storage aisles 130AL. In this example, while additional storage aisle levels 130ALN are added, no additional transfer decks 130B are added such that each transfer deck serves more than one storage aisle level. In the embodiments additional transfer decks 130B may also be added so that each storage aisle level has a respective transfer deck 130B. In the example, shown in FIG. 6D any suitable vertical transfer device 130L, such as for example, lifts, elevators or ramps may be located between the transfer deck 130B and the respective storage aisle levels 130ALN, 130AL to allow bots 110 to traverse between the storage aisles and the transfer decks. It should be realized that while the embodiments described herein illustrate the vertical transfer device 130L being incorporated into the storage structure, in the embodiments the vertical transfer device may be incorporated into the bots 110 in any suitable manner for allowing the bots to transition between different vertically spaced storage aisle levels from a respective one of the transfer decks. In one example, a pivotal ramp 130LR may be provided to allow access from a transfer deck 130B to respective ones of the picking aisle levels 130ALN, 130AL. In the embodiments, the ramps providing access to each of the picking aisle levels from a transfer deck may be fixed but horizontally offset from one another as can be seen in FIG. 6E where ramp 130LRL provides access to a storage aisle level 130AL in substantially the same vertical plane as the transfer deck 130B, ramp 130LRD provides access to a storage aisle level 130ALN below storage aisle level 130AL and ramp 130LRU provides access to a storage aisle level 130ALN above storage aisle level 130AL. As may be realized, each of the transfer decks 130B may be served by the multilevel vertical conveyors 150 in the manner described above. The ramps 130LR or other suitable transfer device 130L may include a transition area substantially similar to transition area 150TA for allowing the bots 110 to transition from the substantially contactless guided travel on the transfer deck 130B to the guided travel of the picking aisles 130A.

Figure 6F:
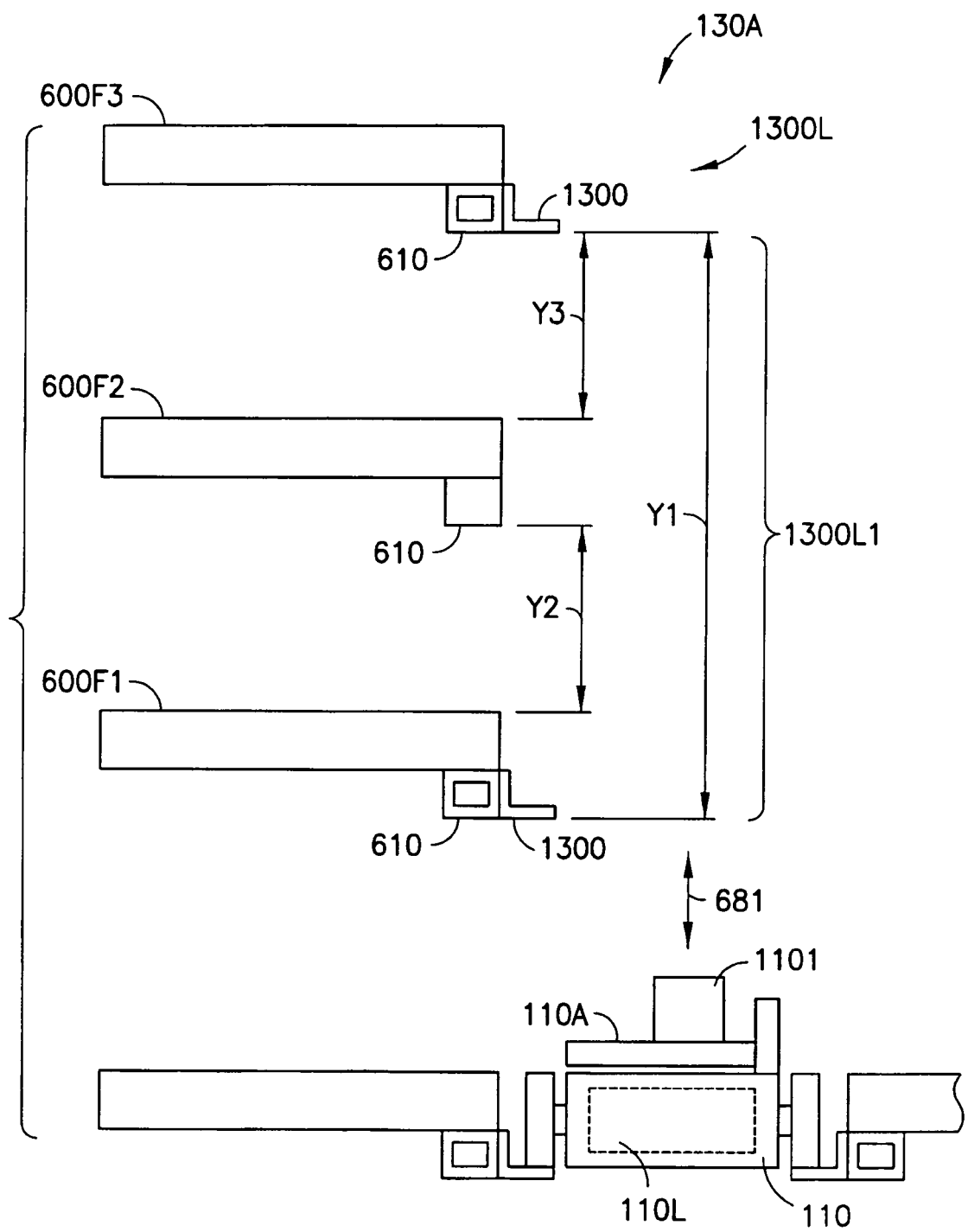

Referring to FIG. 6F, in another aspect the storage structure may be configured such that one or more levels of storage shelves are accessed by but one level of the storage aisle. For example, as described above, each storage aisle includes pairs of rails 1300 disposed on both sides of the storage aisle for the bot 110 to travel on. The pairs of rails are arranged in a vertical stack such that one pair of rails 1300 (e.g. a storage aisle level 1300L) provides bot 110 access to one or more of the vertically stacked storage shelves 600 (e.g. one storage aisle level is common to multiple storage rack levels). In one aspect each storage aisle level 1300L may provide bot 110 access to but one level of storage shelves 600 while in other aspects each storage aisle level 1300L1 may provide bot 110 access to more than one level of storage shelves 600. In still other aspects some storage aisle levels (or a portion thereof) may provide access to one level of storage shelves while other storage aisle levels (or a portion thereof, e.g., in the same or a different storage aisle of the storage structure) may provide access to more than one level of storage shelves 600. The storage aisle levels 1300L may be vertically spaced apart (e.g. the vertical distance between the pairs of rails 1300) by any suitable distance Y1 to allow for the location of at least one storage level between the storage aisle levels 1300L. For exemplary purposes only the distance Y1 may be, for example, about twenty-four inches while in other examples the distance Y1 may be more or less than about twenty-four inches. The distance Y2, Y3 between each storage shelf 600 may be any suitable distance to allow for case units of any suitable size to be placed on the respective storage shelves 600. For exemplary purposes only, the vertical distance Y2 between storage shelves 600F1 and 600F2 may be sufficient for placement of a case unit having a height of about five inches (or any other suitable height) while in other examples the distance Y2 may be any suitable distance for allowing placement of a case unit having a height of more or less than about five inches (or any other suitable height). Also for exemplary purposes only, the vertical distance Y3 between storage shelves 600F2 and 600F3 may sufficient for placement of a case unit having a height of about nine inches while in other examples the distance Y3 may be any suitable distance for allowing placement of a case unit having a height of more or less than about nine inches. While the distances Y2 and Y3 are described above as being different from each other so that the respective storage shelves can accommodate case units of differing heights, in other aspects the distances Y2, Y3 between storage shelves 600 may be substantially the same. As an example, a first or base level shelf 600F1 may be provided closest to the rails 1300 (or transfer deck/aisle structure) where the bot arm 110A may effect picking/placing of case units 1101 on the base level shelf 600F1 with substantially little or no lift. The base level shelf 600F1 may extend a length of the whole picking aisle 130A or part of the length of the picking aisle 130A. One or more upper pick level shelves 600F2, 600F3 may be provided over the base level shelf 600F1 for at least part of the length of the aisle (in one aspect one or more of the upper pick level shelves 600F2, 600F3 may extend substantially the whole length of the picking aisle 130A where desired). The depth of the storage levels 600F1-600F3 may be sufficient for the picking/placing of case units 1101 with the bot arm 110A extension/reach. It is noted that the height of the upper pick levels 600F2, 600F may be varied along the length of the picking aisle 130A (e.g. shelf height may be commensurate with storage distribution). For example, in some portions of the picking aisle 130A one or more of the upper level storage shelves 600F2, 600F3 may be closer to the base shelf 600F1 (e.g. to allow placement of taller case units on the upper shelves), while along other portions of the of the picking aisle 130A one or more of the upper level shelves 600F2, 600F3 may be further away from the base shelf 600F1 to allow taller cases to be placed on the lower shelves. In other aspects other portions of the picking aisle may have the base level shelf 600F1 without any of the upper level storage shelves 600F2, 600F3. The multiple storage levels per picking aisle rail 1300 may exploit the storage volume over the base storage level 600F1 to provide increased rack storage case density per length of rack. The upper rack levels 600F2, 600F3 may be substantially similar to the base level rack 600F1 and have, for example, unconstrained case unit support for dynamic positioning of the case units. The incremented cat seating surface, of the upper storage levels 600F2, 600F3, formed by the inverted hat 620H1, 620H2 storage structure, similar to that of the base level 600F1 (see FIG. 4) is positioned such as by reference to a datum, to allow bot positioning for the base and upper levels 600F1-600F3 with a common bot positioning system in the picking aisles 130A (e.g. the same positioning system is used by the bot for the base and upper storage levels 600F1-600F3). In one aspect one or more of the bot 110 and storage rack levels 600F1-600F3 may include suitable sensors or other flagging devices to confirm a case height for either the base storage level 600F1 or one of the upper storage levels 600F2, 600F3 to confirm the case units 1101 height with a height of the storage rack 600F1-600F3 and bot lift for unhindered picking and placing of the case unit 1101 on the desired storage rack level 600F1-600F3.

Figure 6G:
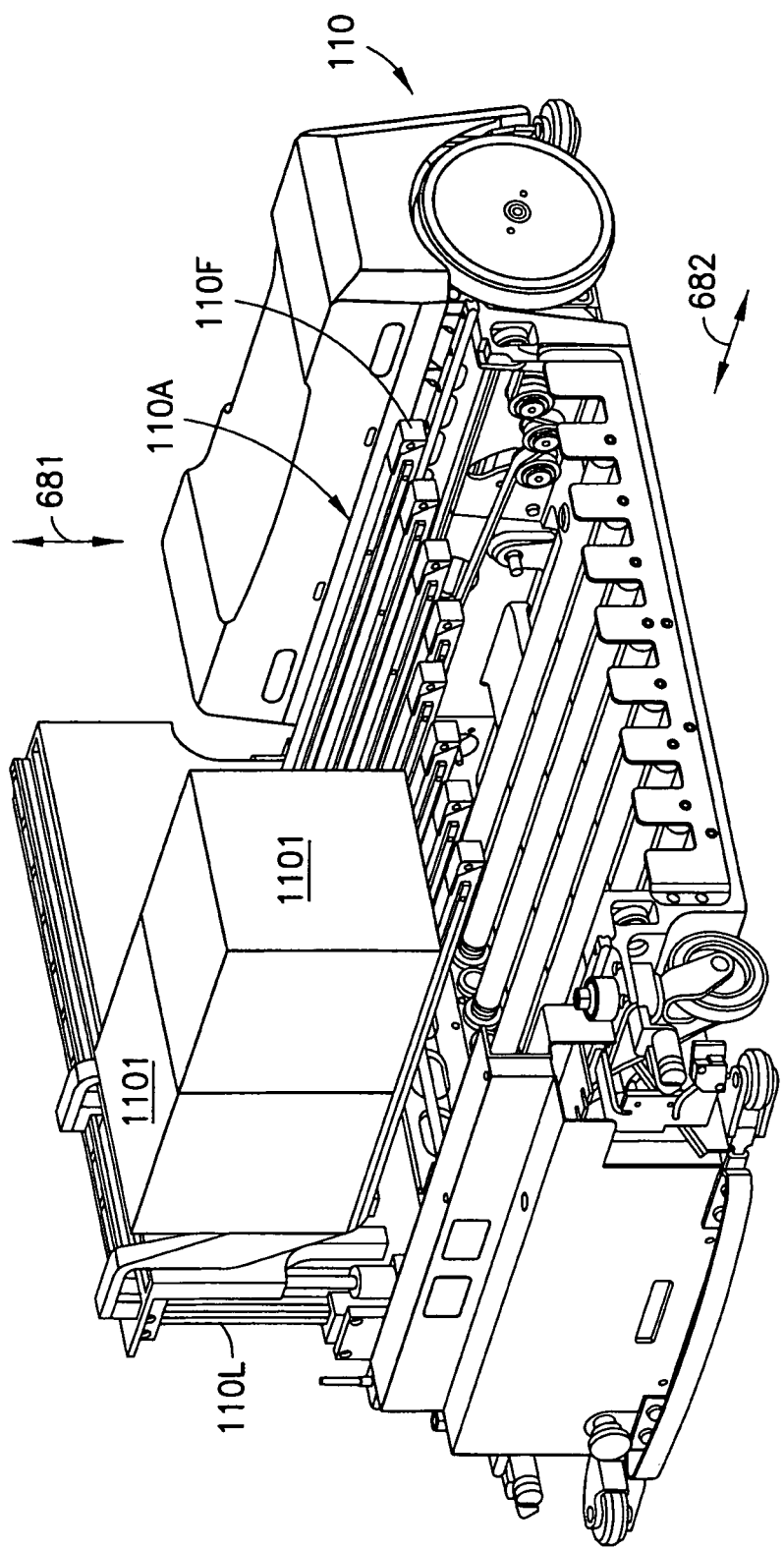
FIG. 6G is a schematic illustration of an autonomous transport in accordance with the embodiments.
Figure 6H:
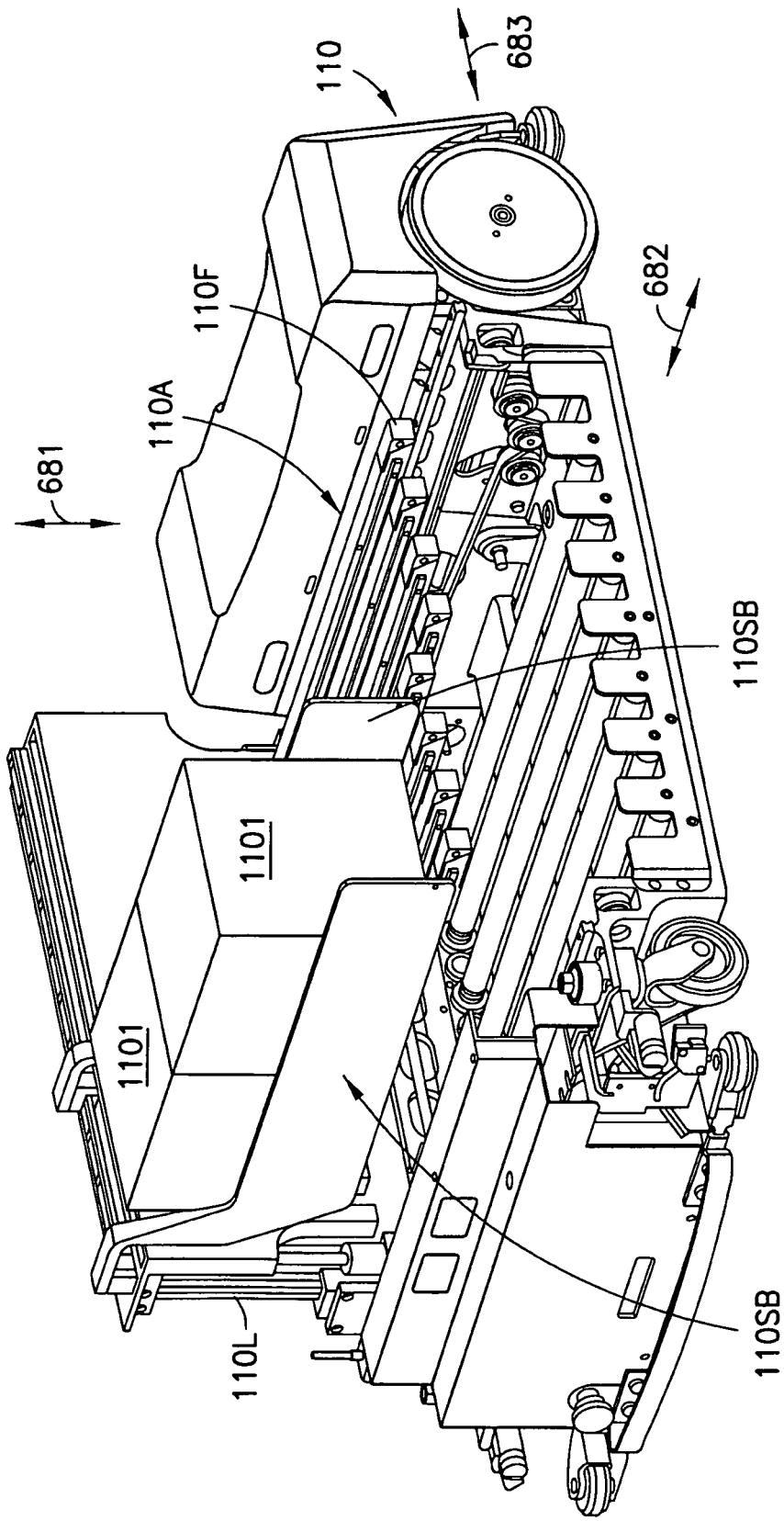
FIG. 6H is a schematic illustration of an autonomous transport in accordance with the embodiments.

Referring also to FIG. 6G, where one or more of the storage aisle levels 1300L provides bot access to at least one level of storage shelves 600 the bot 110 may be configured to transport case units 1101 from the storage aisle level to any one of the storage shelf levels served by that storage aisle level 1300L. For example, in one aspect the bot may have a lift unit 110L configured to raise and lower a transfer arm 110A of the bot 110 in the direction of arrow 681 so that predetermined fingers 110F of the transfer arm 110A may be extended/retracted in the direction of arrow 682 for transferring the case units 1101 between the bot 110 and the respective storage shelf levels. The lift unit 110L may be any suitable drive configured to raise and lower the transfer arm 110A such as, for example, a hydraulic lift, a ball screw mechanism, any suitable linear actuator, a rail system, chain and sprocket system, belt and pulley system or any other suitable drive system. The transfer arm 110A includes fingers 110F for supporting one or more case units 1101 during transfer of the case units between the bot 110 and a storage shelf 600. In one aspect, the lift unit 110L may be configured to lift the transfer arm as a unit while still allowing the fingers 110F to be vertically movable relative to a frame of the transfer arm 110 and extendible in the direction of arrow 682 using a common drive axis as described in, for example, U.S. patent application Ser. No. 13/326,952 which is non-provisional of U.S. Ser. No. 61/423,365 filed on Dec. 15, 2010) entitled "Automated Bot with Transfer Arm" filed on Dec. 15, 2011, and U.S. patent application Ser. No. 13/327,040 which is non-provisional of U.S. Ser. No. 61/423,220 filed on Dec. 15, 2010) entitled "Bot Payload Alignment and Sensing" filed on Dec. 15, 2011 previously incorporated herein by reference. Referring also to FIG. 6H, the bot 110 may also include side blades 110SB mounted to the bot arm 110A. One or more of the blades 110SB may be moved along the longitudinal axis of the bot 110 in the direction of arrow 683 for aligning the pickface (e.g. one or more case units 1101) on the bot arm 110A. The translational movement of the one or more side blades 110SB may allow for the positioning of the bot payload anywhere along the longitudinal axis of the bot within the bot payload area and may provide fine adjustment for case positioning onto the storage shelves 600 (and 600F1-600F3). It is noted that in this aspect the side blades 110SB do not lift the case units 1101 but aid in case unit 1101 control during picking and placing the case units. It is noted that one side blade 110SB may be fixed and act as a datum for aligning the case units 1101.

Figure 7:
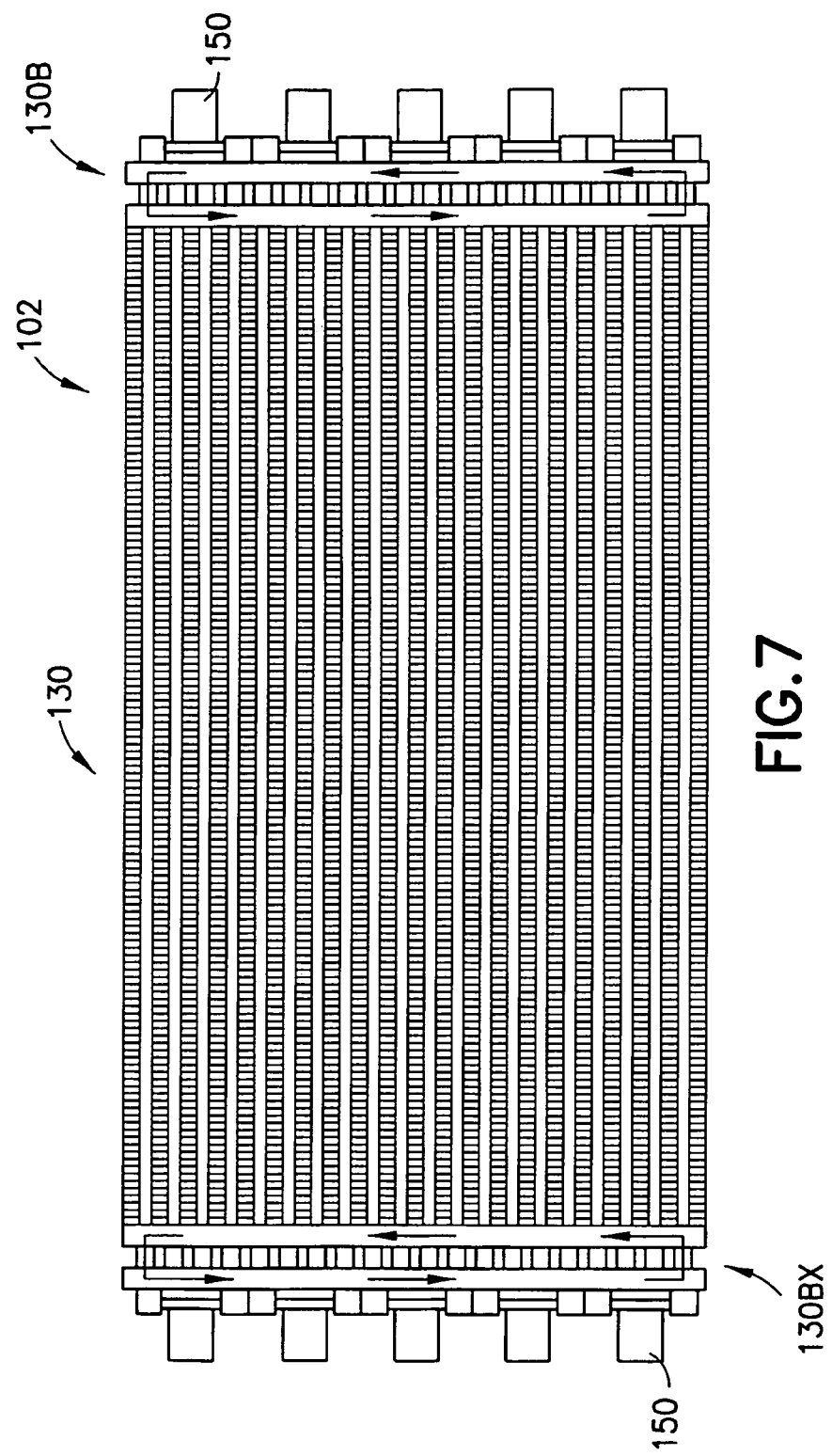
FIG. 7 is a schematic illustration of yet another exemplary storage structure in accordance with the embodiments.

FIG. 7 illustrates another exemplary storage and retrieval system 102 that may be derived from storage and retrieval system 100. Storage and retrieval system 102 may be substantially similar to storage and retrieval system 100. However, in FIG. 7 of the embodiments the storage and retrieval system 102 includes transfer decks 130B, 130BX and multilevel vertical conveyors 150 located at opposite ends of the storage structure 130.

Figure 8:
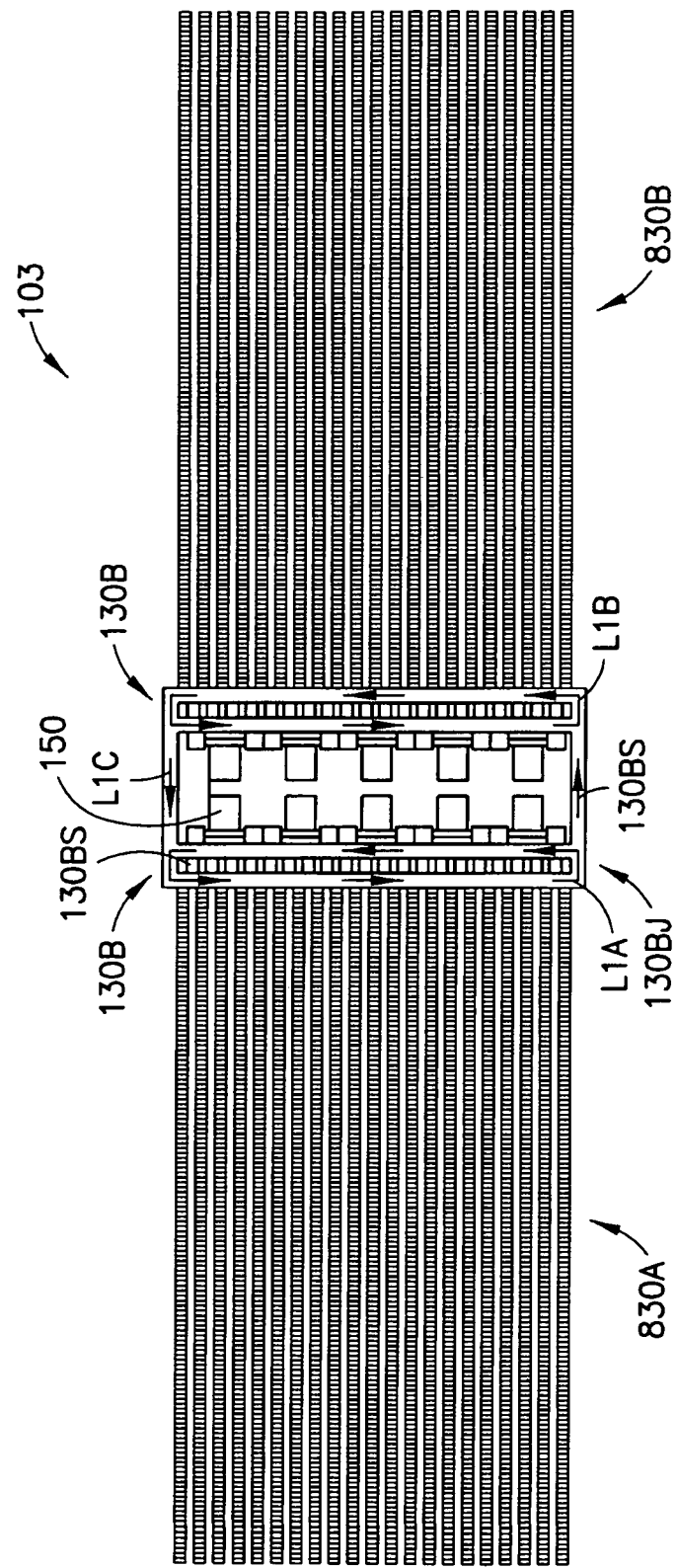
FIG. 8 is a schematic illustration of still another exemplary storage structure in accordance with the embodiments.

FIG. 8 is another storage and retrieval system 103 in accordance with the embodiments. In FIG. 8, storage structures 830A, 830B and their respective transfer decks 130B and multilevel vertical conveyors 150 are arranged in an opposing relationship. The transfer decks 130B may be joined by shunts 130BS at, for example, the ends of the transfer decks to form a unitary transfer deck 130BJ. As may be realized, shunts 130BS may connect the transfer decks 130B at any suitable locations along the length of the transfer decks 130B. In this example, each transfer deck 130B forms a respective bot 110 travel loop L1A, L1B while the shunts allow for another travel loop L1C that is inclusive of the smaller travel loops L1A, L1B. Access to the multilevel vertical conveyors 150 for introducing or removing items to or from the storage and retrieval system, in this example, may be provided in any suitable manner such as through conveyors, carts, or any other suitable conveyance device that may be arranged so as to not interfere with the shunts 130BS that connect the transfer decks 130B.

Figure 9:
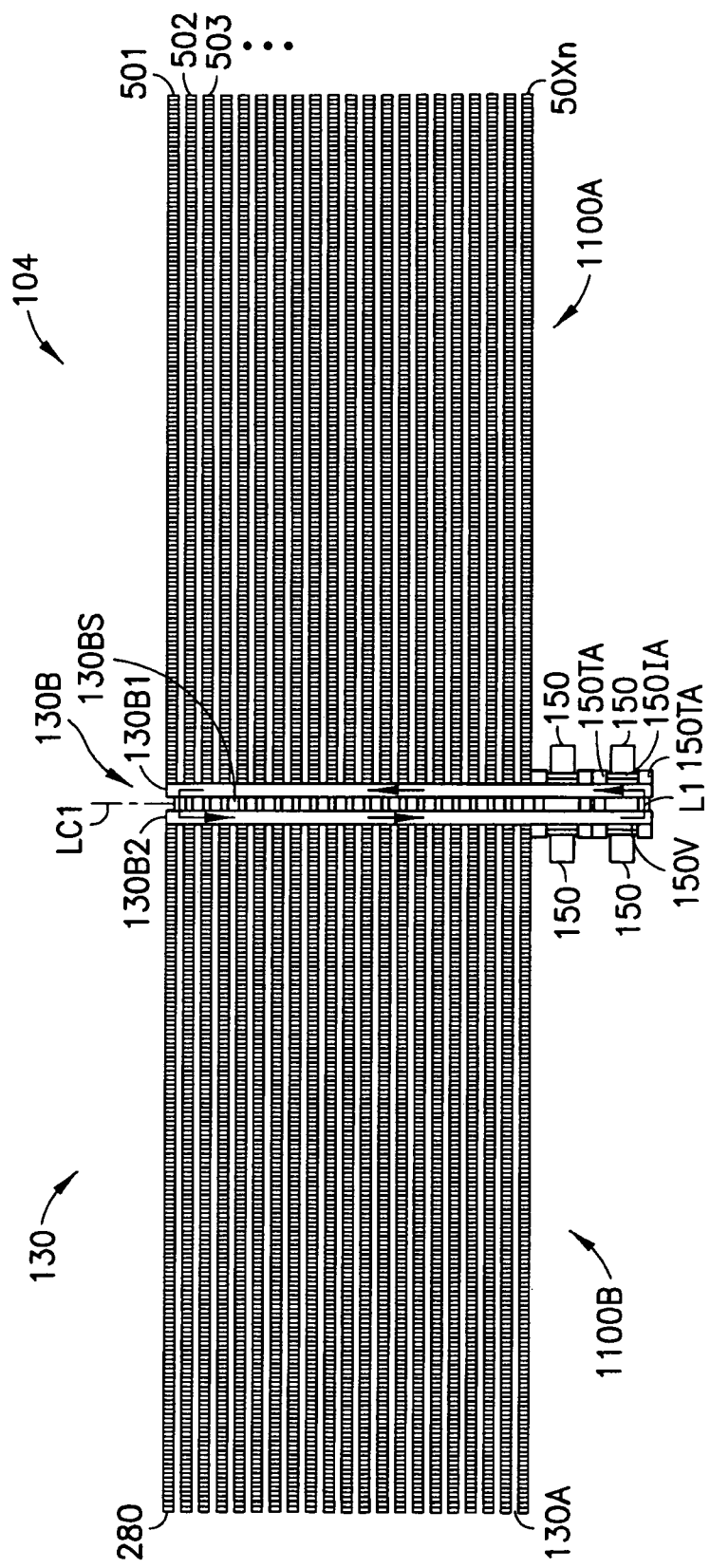
FIG. 9 is a schematic illustration of an exemplary storage structure in accordance with the embodiments.

Referring to FIG. 9, another exemplary storage and retrieval system 104 is shown. The storage and retrieval system 104 may be substantially similar to storage and retrieval system 100 except were otherwise noted. In FIG. 9 the storage modules 501, 502, 503, . . . , 50Xn may be arranged on either side of the transfer deck 130B in, for example, a substantially symmetrically opposed or "butterfly" configuration. In this example, the transfer deck 130B is lengthened to extend past the storage aisles 130A where the multilevel vertical conveyors are connected to the transfer deck 130B at this extended portion of the transfer deck as will be described in greater detail below. It is noted that while four multilevel vertical conveyors 150 are shown in FIG. 9 for exemplary purposes only, in the embodiments the storage and retrieval system may have more or less than four multilevel vertical conveyors.

The substantially symmetrically opposed configuration of the storage structure may allow for reduced transfer deck 130B and storage aisle 130A lengths while providing an increased amount of storage spaces within the storage aisles when compared to warehouse storage structures having storage aisles arranged on but one side of a transfer deck and having substantially the same storage capacity. The substantially symmetrically opposed storage structure may also provide for reducing the travel time of the bots 110 on the transfer deck 130B and storage aisles 130A when compared to the warehouse storage structures having storage aisles arranged on but one side of a transfer lane having substantially the same storage capacity.

In the embodiments, the transfer deck 130B may have, for example, main travel lanes 130B1, 130B2 connected by any suitable number of shunts 130BS which are substantially similar to those described above. The main travel lanes 130B1, 130B2 may also provide the bots 110 with access to vestibules 150V for each multilevel vertical conveyor 150 in a manner substantially similar to that described above. As can be seen in FIG. 9, the arrangement of the multilevel vertical conveyors 150 and their respective vestibules 150V may be arranged in a substantially symmetrical opposing configuration such that the arrangement of the multilevel vertical conveyors and vestibules are substantially symmetrical about a longitudinal centerline LC1 of the transfer deck 130B.

The storage structure 130 includes at least two opposing storage sections 1100A, 1100B extending in substantially opposite directions from the transfer deck 130B. In the embodiments there may be more than two opposing storage sections. Each of the opposing storage sections 1100A, 1100B may be substantially similar to each other such that the storage structure 130 is substantially symmetrical about the longitudinal centerline LC1 of the transfer deck 130B. It is noted, however, that while the storage structure 130 itself may have a substantially symmetrically opposed configuration the items stored within each storage section 1100A, 1100B may not have substantially symmetric storage locations (e.g. the allocation of case units/pickfaces in each of the storage sections 1100A, 1100B is substantially independent of the allocation of case units/pickfaces in the other one of the storage sections 1100A, 1100B). In the embodiments, the allocation of the case units/pickfaces in each of the storage sections 1100A, 1100B may also be substantially symmetrical. As may be realized, the end of each storage aisle 130A of each storage section 1100A, 1100B may include a transition bay or area substantially similar to the transition areas 150TA that allows the bots 110 to transition onto the transfer decks 130B.

Figure 10:
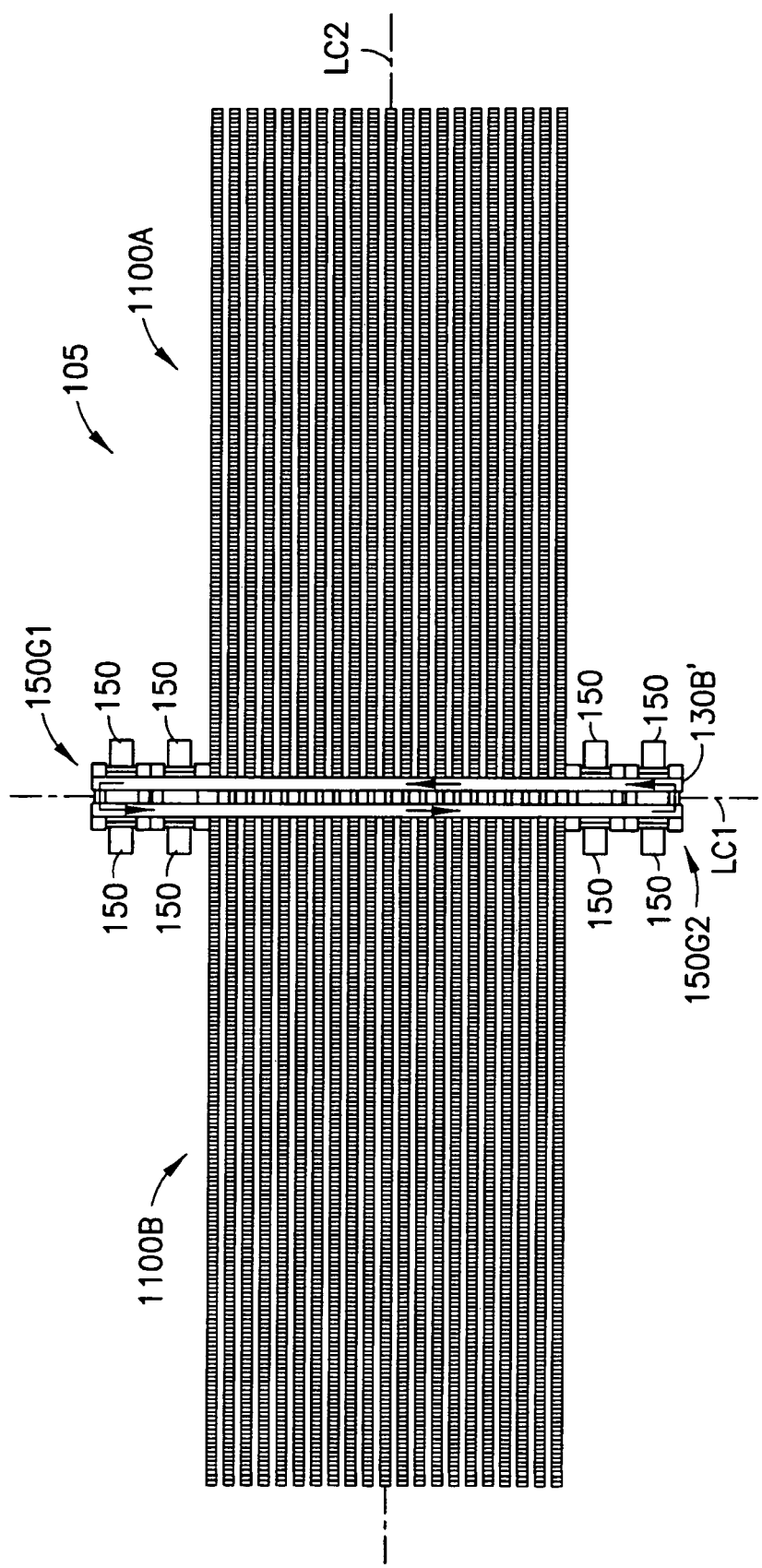
FIG. 10 is a schematic illustration of another exemplary storage structure in accordance with the embodiments.

FIG. 10 illustrates another substantially symmetrically opposed storage and retrieval system 105 in accordance with the embodiments. In FIG. 10 the transfer deck 130B' (which may be substantially similar to transfer deck 130B) extends on opposite sides of the storage sections 1100A, 1100B so that multilevel vertical conveyor groups 150G1, 150G2 may be placed on opposite sides of the storage sections along the longitudinal axis LC1. While there are four multilevel vertical conveyors shown in each of the multilevel vertical conveyor groups 150G1, 150G2, in the embodiments each group may have any suitable number of multilevel vertical conveyors. In a manner substantially similar to that described above, the multilevel vertical conveyors 150 of each multilevel vertical conveyor group 150G1, 150G2 may be arranged in a substantially symmetrically opposed configuration. However, in the embodiments the conveyors may not have a substantially symmetrically opposed arrangement. In this example, the multilevel vertical conveyor groups 150G1, 150G2 may also be arranged substantially symmetrically along a lateral centerline LC2 of the transfer deck 130B'.

Figure 11:
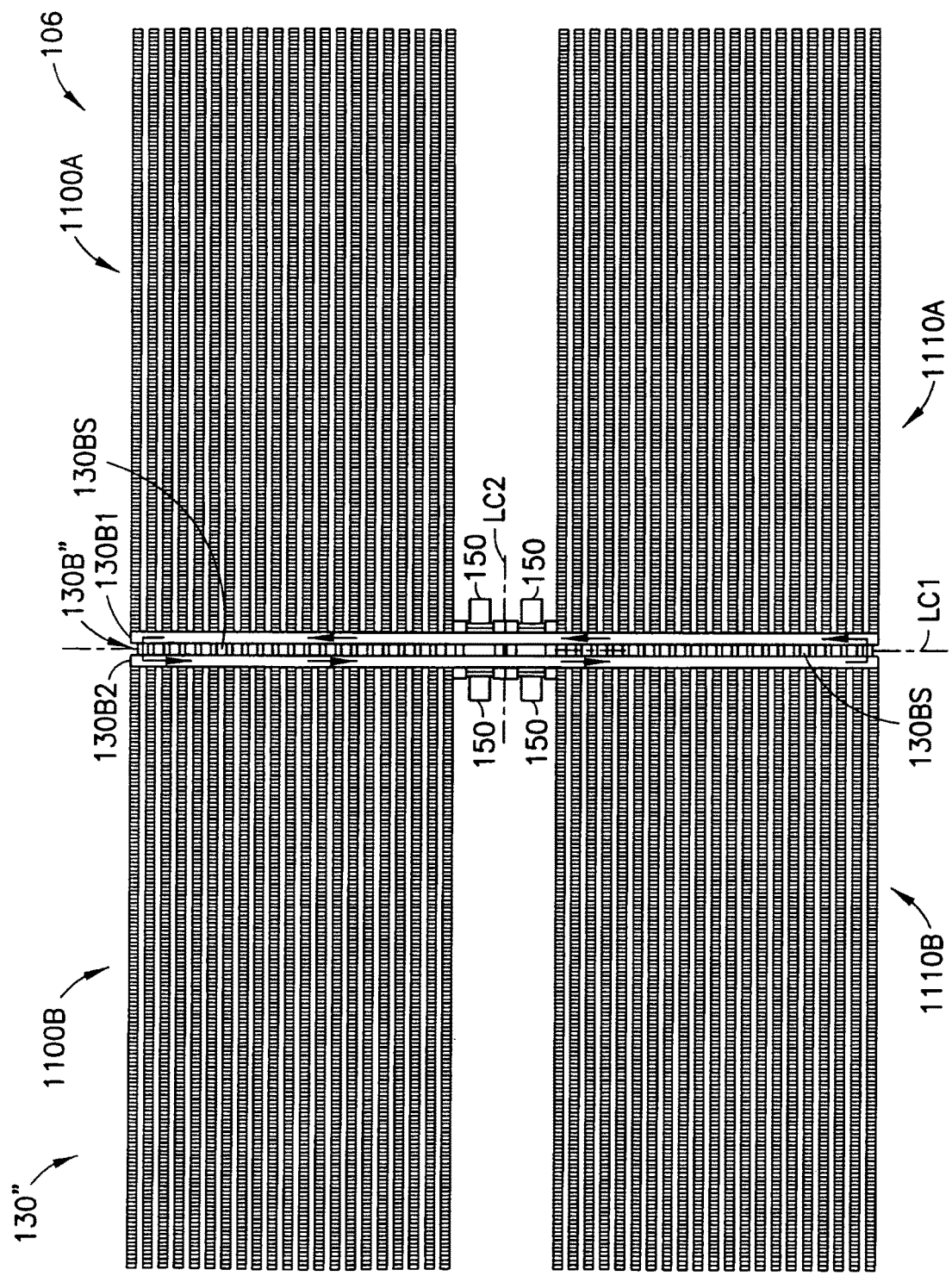
FIG. 11 is a schematic illustration of yet another exemplary storage structure in accordance with the embodiments.

Referring to FIG. 11, another a storage and retrieval system 106 having a substantially symmetrically opposed storage structure 130" is shown in accordance with the embodiments. In this example, the storage and retrieval system 106 may be substantially similar to storage and retrieval system 104 described above. However, in this example, the substantially symmetrically opposed storage structure 130" includes, for example, four storage sections 1100A, 1100B, 1110A, 1110B. The storage sections 1100A, 1100B, 1110A, 1110B may be arranged in opposing pairs where each storage area in an opposing pair is located on opposite sides of the transfer deck 130B" (which is substantially similar to transfer deck 130B described above). For example, storage sections 1100A, 1100B form a first pair of opposing storage sections and the storage sections 1110A, 1110B form a second pair of opposing storage sections. In the embodiments, there may be more than two pairs of opposing storage sections. These pairs of storage sections may be symmetrically opposed about the longitudinal centerline LC1 of the transfer deck 130B" in a manner substantially similar to that described above with respect to FIG. 9.

In this example the storage and retrieval system 106 includes multilevel vertical conveyors 150 that are located between the first pair of opposing storage areas 1100A, 1100B and the second pair of opposing storage areas 1110A, 1110B along the longitudinal centerline LC1. In this example, there are four multilevel vertical conveyors (e.g. in opposing pair configurations as described above) but in the embodiments there may be more or less than four multilevel vertical conveyors arranged in, for example, opposing pairs or any other suitable arrangement.

As can be seen in FIG. 11, the transfer deck also includes lateral centerline LC2. In this example the multilevel vertical conveyors 150 and the storage sections 1100A, 1100B, 1110A, 1110B are also substantially symmetrical about the lateral centerline LC2. Here, the first pair of storage sections 1100A, 1100B and two of the multilevel vertical conveyors 150 are located on a first side of the lateral centerline LC2 while the second pair of storage sections 1110A, 1110B and the other two multilevel vertical conveyors are located on a second side of the lateral centerline LC2 in an opposing configuration. As can be seen in FIG. 11 the storage and retrieval system 106 is substantially symmetrical along two axes (e.g. LC1, LC2) of the transfer deck 130B". As may be realized while there are four multilevel vertical conveyors shown in FIG. 11, in the embodiments there may be any suitable number of multilevel vertical conveyors disposed between the storage section pairs. As may also be realized, while there are two pairs of storage areas in this example, there may be more than two pairs of storage areas arranged in a substantially symmetrical opposing configuration relative to the lateral centerline LC2 of the transfer deck 130B".

Figure 12:
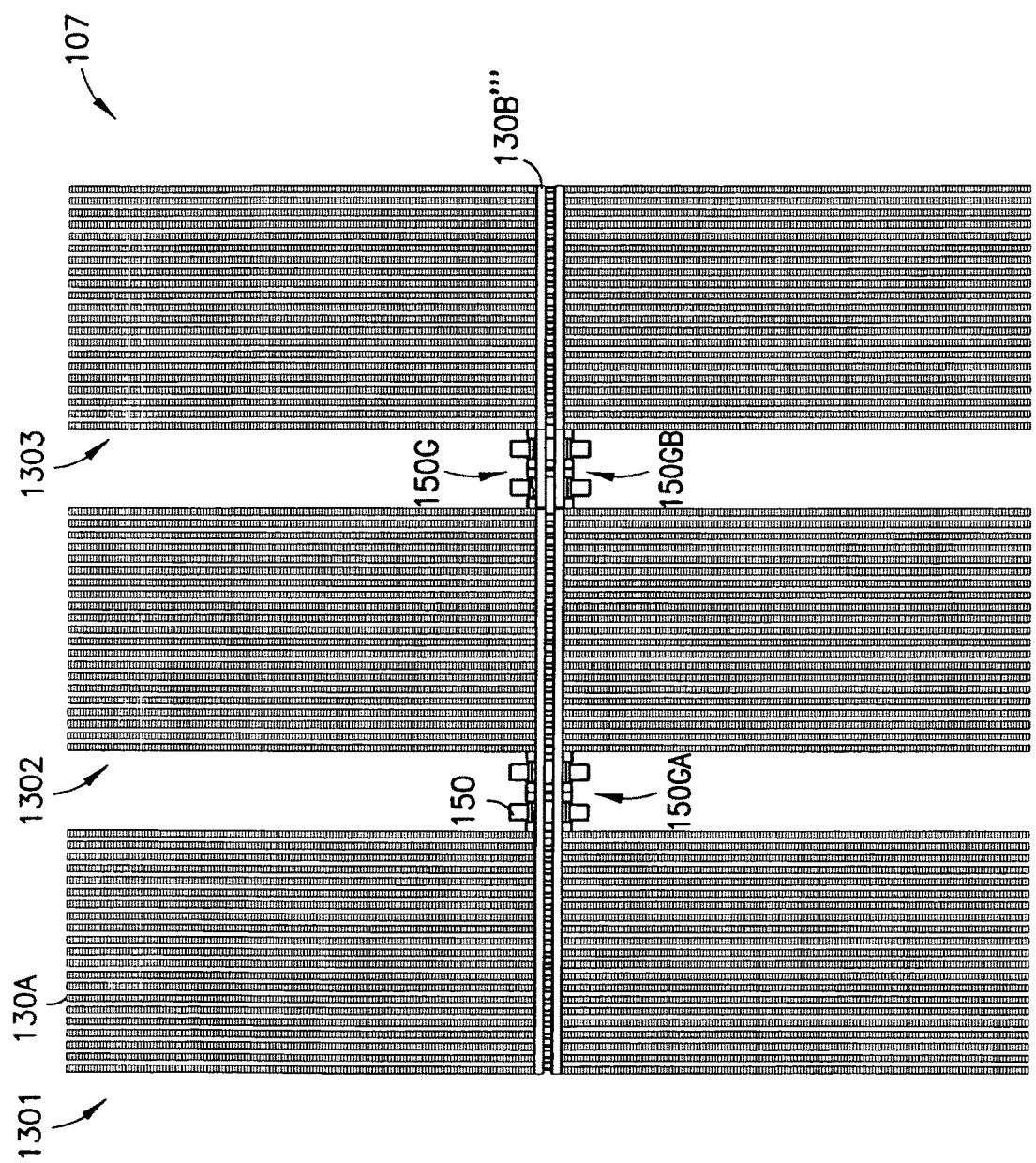
FIG. 12 is a schematic illustration of still another exemplary storage structure in accordance with the embodiments.
Figure 13:
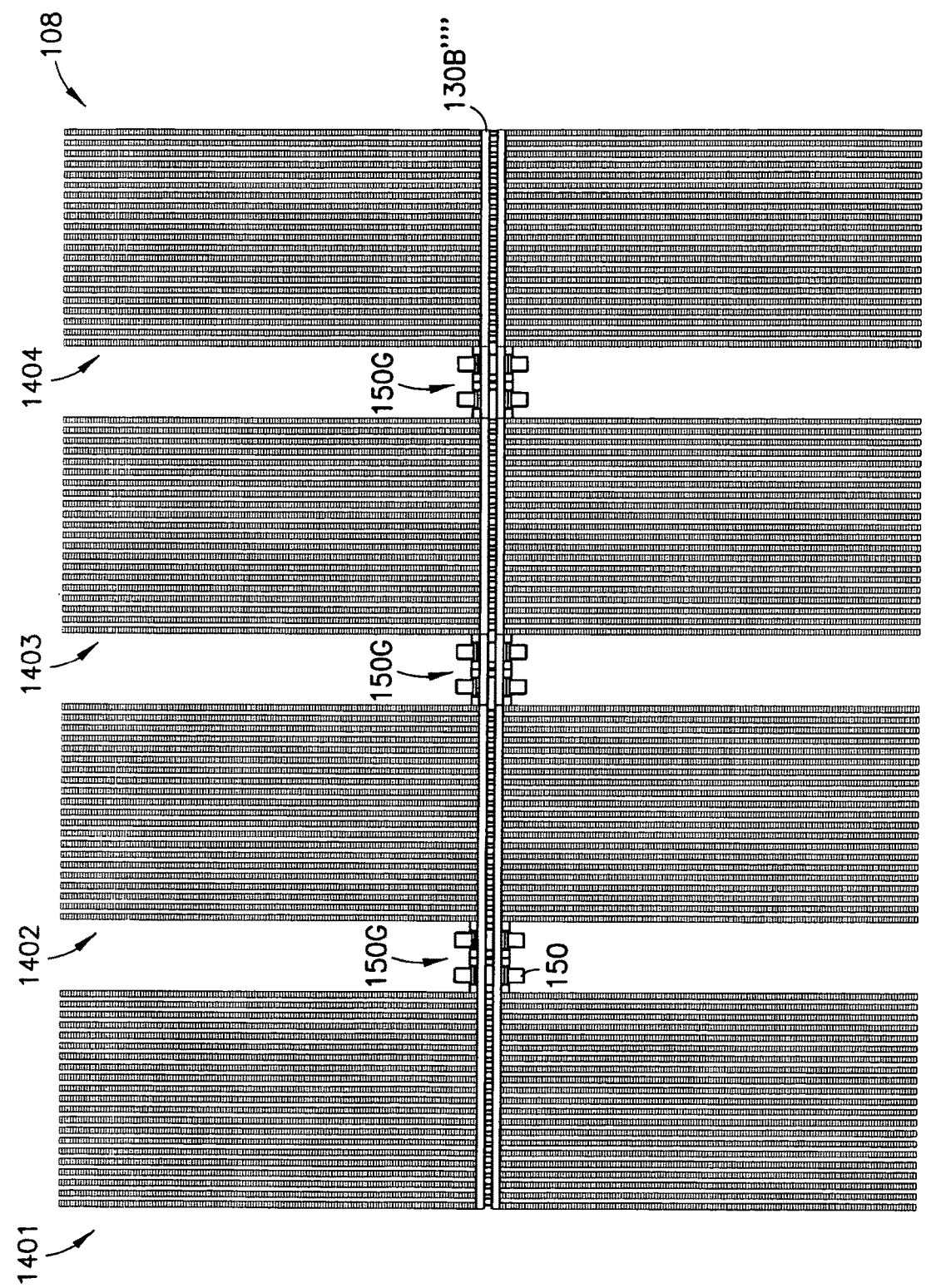
FIG. 13 is a schematic illustration of another exemplary storage structure in accordance with the embodiments.

FIGS. 12 and 13 illustrate storage and retrieval systems 107 and 108 with multiple pairs of substantially symmetrical opposing storage areas. In FIG. 12 the storage and retrieval system 107 includes two groups 150G of multilevel vertical conveyors 150 and three pairs of opposed storage sections 1301, 1302, 1303. Access is provided to each multilevel vertical conveyor 150 and each storage aisle 130A of the multilevel vertical conveyor groups 150G and storage sections 1301, 1302, 1303 by transfer deck 130B''', which may be substantially similar to transfer deck 130B described above. In FIG. 13 the storage and retrieval system 108 includes three groups 150G of multilevel vertical conveyors 150 and four pairs of opposed storage sections 1401, 1402, 1403, 1404. Access is provided to each multilevel vertical conveyor 150 and each storage aisle 130A of the multilevel vertical conveyor groups 150G and storage sections 1401, 1402, 1403, 1404 by transfer deck 130B'''', which may be substantially similar to transfer deck 130B described above. As may be realized, the configurations of the substantially symmetrically opposed storage and retrieval systems 107, 108 of FIGS. 12 and 13 are exemplary only and in the embodiments, the storage and retrieval system 107, 108 may have any suitable number of multilevel vertical conveyors groups and/or pairs of opposed storage sections. In the embodiments the storage and retrieval systems 107, 108 may include multilevel vertical conveyor groups on one or more ends of their respective transfer decks 130''', 130'''' in a manner substantially similar to that described above with respect to FIGS. 9 and 10.

In addition to the configuration of the storage and retrieval system, the travel time of, for example the bots 110 along the transfer decks 130B and storage aisles 130A of the warehouse storage structures described herein may be managed in any suitable manner such as by, for example, any suitable controller of the storage and retrieval system. In one example, the control server 120 may be configured to assign bots 110 for operation with predetermined ones of the multilevel vertical conveyors and/or storage aisles in a manner substantially similar to that described below. For example, referring to FIG. 12 the control server 120 may be configured to assign bots 110 for operation with predetermined ones of the multilevel vertical conveyor groups 150G and/or storage sections 1401, 1402, 1403, 1404. For exemplary purposes only, referring to FIG. 12 a first group of bots 110 may be allocated for operation with multilevel vertical conveyor group 150GA and storage sections 1301, 1302 while a second group of bots may be allocated for operation with multilevel vertical conveyor group 150GB and storage sections 1302, 1303. As may be realized, other suitable bot allocations can be made with respect to the storage sections and multilevel vertical conveyor groups for controlling the travel time of the bots within the storage and retrieval systems. In this manner the travel time of each bot along the transfer deck and the respective storage aisles to which the bot is assigned is substantially the same as the time for traversing the storage aisles and transfer deck of the warehouse storage structure described above with respect to FIGS. 5,7, and 9-11. Similar bot allocations can be made with respect to the warehouse storage structure of FIGS. 6, 8, 13 or any other suitable warehouse storage structure described herein.

In a first aspect of the disclosed embodiment a storage and retrieval system is provided. The storage and retrieval system includes a transfer deck having a longitudinal axis, a first storage section and a second storage section. The first storage section and second storage section are located on opposite sides of the transfer deck and are substantially symmetrically opposed to one another about the longitudinal axis, where each of the first and second storage sections includes storage aisles that are in communication with the transfer deck.

In accordance with a first sub-aspect of the first aspect of the disclosed embodiment, the transfer deck includes a first end and a second end, the storage and retrieval system further comprising at least one multilevel vertical conveyor at one or more of the first and second end of the transfer deck.

In accordance with the first sub-aspect of the first aspect of the disclosed embodiment, the at least one multilevel vertical conveyor includes at least two multilevel vertical conveyors, one of the at least two multilevel vertical conveyors being located on a first side of the transfer deck and another of the at least two multilevel vertical conveyors being located on a second side of the transfer deck in a substantially symmetrically opposed configuration with the one of the at least two multilevel vertical conveyors.

In accordance with the first sub-aspect of the first aspect of the disclosed embodiment, each of the at least one multilevel vertical conveyor is connected to the transfer deck through a vestibule configured to allow access to a respective multilevel vertical conveyor without substantially disrupting a flow of objects along the transfer deck.

In accordance with the first aspect of the disclosed embodiment, the transfer deck provides access to each of the storage aisles.

In accordance with the first aspect of the disclosed embodiment, wherein the storage and retrieval system further includes at least one multilevel vertical conveyor connected to the transfer deck and at least one autonomous transport vehicle configured to traverse the transfer deck and storage aisles for transferring items between storage locations of the storage sections and the at least one multilevel vertical conveyor.

In accordance with the first aspect of the disclosed embodiment, each storage section comprises multiple levels of storage locations where each level is vertically stacked one above the other and the storage aisles comprise multiple vertically stacked levels where at least one storage aisle level is common to more than one level of storage locations. In a further aspect the storage and retrieval system further includes at least one autonomous transport vehicle configured to traverse the transfer deck and the storage aisles, the at least one autonomous transport vehicle being configured to access the more than one level of storage locations from the storage aisle level common to the more than one level of storage locations.

In accordance with the first aspect of the disclosed embodiment, each storage section comprises multiple levels of storage locations where each level is vertically stacked one above the other and the transfer deck comprises multiple vertically stacked levels corresponding to the levels of each of the storage sections.

In accordance the first aspect of the disclosed embodiment, each storage section includes multiple levels of storage locations where each level is vertically stacked one above the other and the transfer deck includes multiple vertically stacked levels where each transfer deck level is configured to provide access to more than one level of storage locations.

In accordance with a second aspect of the disclosed embodiment, a warehouse storage structure is provided. The storage structure includes a transfer deck having a longitudinal axis and at least one pair of storage sections where each of the at least one pair of storage sections includes a first storage section and a second storage section. The first storage section and second storage section of each of the at least one pair of storage sections having a substantially symmetrical opposed configuration relative to the longitudinal axis of the transfer deck, where each of the first and second storage sections includes storage aisles that are in communication with the transfer deck.

In accordance with a first sub-aspect of the second aspect of the disclosed embodiment, the warehouse storage structure further includes at least one multilevel vertical conveyor connected to the transfer deck.

In accordance with the first sub-aspect of the second aspect of the disclosed embodiment, wherein each of the at least one multilevel vertical conveyor is connected to the transfer deck through a vestibule configured to allow access to a respective multilevel vertical conveyor without substantially disrupting a flow of objects along the transfer deck.

In accordance with the first sub-aspect of the second aspect of the disclosed embodiment, the transfer deck includes a first end and a second end and the at least one multilevel vertical conveyor is connected to the transfer deck at one or more of the first and second end.

In accordance with the second aspect of the disclosed embodiment wherein the at least one pair of storage sections includes at least two pairs of storage sections, and the at least one multilevel vertical conveyor is connected to the transfer deck between the at least two pairs of storage sections.

In accordance with the second aspect of the disclosed embodiment, the transfer deck includes a lateral axis and the at least one pair of storage sections includes at least two pairs of storage sections disposed along the transfer deck in a substantially symmetrical configuration relative to the lateral axis.

In accordance with the second aspect of the disclosed embodiment, each storage section in the at least one pair of storage sections includes storage aisles connected to the transfer deck and the transfer deck includes transfer paths, the warehouse storage structure further including shunts connecting the transfer paths where each shunt is substantially in line with a respective storage aisle.

In accordance with the second aspect of the disclosed embodiment, each storage section comprises multiple levels of storage locations where each level is vertically stacked one above the other and the storage aisles comprise multiple vertically stacked levels where at least one storage aisle level is common to more than one level of storage locations. In a further aspect, the storage and retrieval system further includes at least one autonomous transport vehicle configured to traverse the transfer deck and the storage aisles, the at least one autonomous transport vehicle being configured to access the more than one level of storage locations from the storage aisle level common to the more than one level of storage locations.

In accordance with a third aspect of the disclosed embodiment a storage and retrieval system includes an array of multilevel storage rack modules having storage areas separated by picking aisles where the storage areas includes shelves configured to allow placement of uncontained case units substantially anywhere along the shelves, multiple levels of stacked tiers, including at least one transfer deck and the picking aisles where each picking aisle provides access to multiple levels of the multilevel storage rack modules, and at least one autonomous transport vehicle located on one of the multiple levels of stacked tiers, the at least one autonomous transport vehicle being configured to traverse at least one transfer deck and picking aisles of at least one of the multiple levels of stacked tiers to transport at least one uncontained case unit to and from the multiple levels of the multilevel storage rack modules of a respective picking aisle, the at least one autonomous transport vehicle being configured to access each of the multiple levels of the multilevel storage rack modules of the respective picking aisle.

It should be understood that the embodiments described herein can be used individually or in any suitable combination thereof. It should also be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. A storage and retrieval system comprising:
a fixed transfer deck having a longitudinal axis and disposed in a fixed position; and
a first storage section and a second storage section each including storage locations, the first storage section and second storage section are located on opposite sides of the fixed transfer deck and are substantially symmetrically opposed to one another about the longitudinal axis, where:
each of the first and second storage sections includes storage racks, each of the storage racks has respective storage locations and is configured for storing different independent items in a row along the storage racks,
each storage rack is disposed along storage aisles so that the row of different independent items are stored on each rack, with the different independent items extending in row, along a common one of the storage aisles, and
the storage aisles are in communication with the transfer deck and provide access to the storage locations disposed along sides of the storage aisles; and
wherein:
the fixed transfer deck forms an autonomously guided transport vehicle riding surface upon which an autonomously guided transport vehicle disposed on the fixed transfer deck rides so as to traverse the fixed transfer deck, and
the storage aisles define respective autonomously guided transport vehicle riding surfaces upon which the autonomously guided transport vehicle disposed in the storage aisles rides so as to traverse along the storage aisle riding surfaces effecting access, through the storage aisles, to the storage locations disposed along opposite sides of the storage aisles with the autonomously guided transport vehicle disposed on and travelling along the autonomously guided transport vehicle riding surfaces of a respective storage aisle, where the storage aisle riding surfaces are in communication with the autonomously guided transport vehicle riding surface of the fixed transfer deck so that the autonomously guided transport vehicle crosses from riding on the autonomously guided transport vehicle riding surface of the fixed transfer deck to riding on the autonomously guided transport vehicle riding surfaces of the storage aisles.

2. The storage and retrieval system of claim 1, wherein the fixed transfer deck includes a first end and a second end, the storage and retrieval system further comprising at least one multilevel vertical conveyor at one or more of the first and second end of the fixed transfer deck.

3. The storage and retrieval system of claim 2, wherein the at least one multilevel vertical conveyor includes at least two multilevel vertical conveyors, one of the at least two multilevel vertical conveyors being located on a first side of the fixed transfer deck and another of the at least two multilevel vertical conveyors being located on a second side of the fixed transfer deck in a substantially symmetrically opposed configuration with the one of the at least two multilevel vertical conveyors.

4. The storage and retrieval system of claim 2, wherein each of the at least one multilevel vertical conveyor is connected to the fixed transfer deck through a vestibule configured to allow access to a respective multilevel vertical conveyor without substantially disrupting a flow of objects along the fixed transfer deck.

5. The storage and retrieval system of claim 1, wherein the fixed transfer deck provides access to each of the storage aisles.

6. The storage and retrieval system of claim 1, further comprising at least one multilevel vertical conveyor connected to the transfer deck and at least one autonomously guided transport vehicle configured to traverse the fixed transfer deck and storage aisles for transferring items between storage locations of the storage sections and the at least one multilevel vertical conveyor.

7. The storage and retrieval system of claim 1, wherein each storage section comprises multiple levels of storage locations where each level is vertically stacked one above the other and the fixed transfer deck comprises multiple vertically fixed stacked levels corresponding to the levels of each of the storage sections.

8. The storage and retrieval system of claim 1, wherein each storage section comprises multiple levels of storage locations where each level is vertically stacked one above the other and the storage aisles comprise multiple vertically stacked levels where at least one storage aisle level is common to more than one level of storage locations.

9. The storage and retrieval system of claim 8, further comprising at least one autonomously guided transport vehicle configured to traverse the fixed transfer deck and the storage aisles, the at least one autonomously guided transport vehicle being configured to access the more than one level of storage locations from the storage aisle level common to the more than one level of storage locations.

10. The storage and retrieval system of claim 1, wherein each storage section comprises multiple levels of storage locations where each level is vertically stacked one above the other and the fixed transfer deck comprises multiple vertically stacked levels where each transfer deck level is vertically fixed and configured to provide access to more than one level of storage locations.

11. A warehouse storage structure comprising:
a fixed transfer deck having a longitudinal axis and disposed in a fixed position; and
at least one pair of storage sections where each of the at least one pair of storage sections includes a first storage section and a second storage section each having storage locations, the first storage section and second storage section of each of the at least one pair of storage sections having a substantially symmetrical opposed configuration relative to the longitudinal axis of the fixed transfer deck, where:
each of the first and second storage sections includes storage racks, each of the storage racks has respective storage locations and is configured for storing different independent items in a row along the storage racks,
each storage rack is disposed along storage aisles so that the row of different independent items are stored on each rack, with the different independent items extending in row, along a common one of the storage aisles, and the storage aisles are in communication with the fixed transfer deck and provide access to the storage locations disposed along sides of the storage aisles; and wherein:

the fixed transfer deck forms an autonomously guided transport vehicle riding surface upon which an autonomously guided transport vehicle disposed on the fixed transfer deck rides so as to traverse the fixed transfer deck, and the storage aisles define respective autonomously guided transport vehicle riding surfaces upon which the autonomously guided transport vehicle disposed in the storage aisles rides so as to traverse along the storage aisle riding surfaces effecting access, through the storage aisles, to the storage locations disposed along opposite sides of the storage aisles with the autonomously guided transport vehicle disposed on and travelling along the autonomously guided transport vehicle riding surfaces of a respective storage aisle, where the storage aisle riding surfaces are in communication with the autonomously guided transport vehicle riding surface of the fixed transfer deck so that the autonomously guided transport vehicle crosses from riding on the autonomously guided transport vehicle riding surface of the fixed transfer deck to riding on the autonomously guided transport vehicle riding surfaces of the storage aisles.

12. The warehouse storage structure of claim 11, further comprising at least one multilevel vertical conveyor connected to the fixed transfer deck.

13. The warehouse storage structure of claim 12, wherein each of the at least one multilevel vertical conveyor is connected to the fixed transfer deck through a vestibule configured to allow access to a respective multilevel vertical conveyor without substantially disrupting a flow of objects along the fixed transfer deck.

14. The warehouse storage structure of claim 12, wherein the fixed transfer deck includes a first end and a second end and the at least one multilevel vertical conveyor is connected to the fixed transfer deck at one or more of the first and second end.

15. The warehouse storage structure of claim 12, wherein the at least one pair of storage sections includes at least two pairs of storage sections, and the at least one multilevel vertical conveyor is connected to the fixed transfer deck between the at least two pairs of storage sections.

16. The warehouse storage structure of claim 11, wherein the fixed transfer deck includes a lateral axis and the at least one pair of storage sections includes at least two pairs of storage sections disposed along the fixed transfer deck in a substantially symmetrical configuration relative to the lateral axis.

17. The warehouse storage structure of claim 11, wherein each storage section in the at least one pair of storage sections includes storage aisles connected to the fixed transfer deck and the fixed transfer deck includes transfer paths, the warehouse storage structure further including shunts connecting the transfer paths where each shunt is substantially in line with a respective storage aisle.

18. The storage and retrieval system of claim 11, wherein each storage section comprises multiple levels of storage locations where each level is vertically stacked one above the other and the storage aisles comprise multiple vertically stacked levels where at least one storage aisle level is common to more than one level of storage locations.

19. The storage and retrieval system of claim 18, further comprising at least one autonomously guided transport vehicle configured to traverse the fixed transfer deck and the storage aisles, the at least one autonomously guided transport vehicle being configured to access the more than one level of storage locations from the storage aisle level common to the more than one level of storage locations.

\* \* \* \* \*